(12) United States Patent
Tsuno

(10) Patent No.: US 11,269,207 B2
(45) Date of Patent: Mar. 8, 2022

(54) LIQUID CRYSTAL DISPLAY APPARATUS AND ELECTRONIC EQUIPMENT

(71) Applicant: SONY CORPORATION, Tokyo (JP)

(72) Inventor: Hitoshi Tsuno, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,332

(22) PCT Filed: Jun. 12, 2019

(86) PCT No.: PCT/JP2019/023297
§ 371 (c)(1),
(2) Date: Jan. 6, 2021

(87) PCT Pub. No.: WO2020/012859
PCT Pub. Date: Jan. 16, 2020

(65) Prior Publication Data
US 2021/0271126 A1    Sep. 2, 2021

(30) Foreign Application Priority Data
Jul. 13, 2018 (JP) .............................. JP2018-132857

(51) Int. Cl.
G02F 1/1333 (2006.01)
G02F 1/1339 (2006.01)
G02F 1/1337 (2006.01)

(52) U.S. Cl.
CPC ...... *G02F 1/133345* (2013.01); *G02F 1/1337* (2013.01); *G02F 1/13394* (2013.01); *G02F 1/13396* (2021.01); *G02F 1/13398* (2021.01)

(58) Field of Classification Search
CPC ............. G02F 1/133345; G02F 1/1337; G02F 1/13394; G02F 1/13396; G02F 1/13398
See application file for complete search history.

(56) References Cited

U.S. PATENT DOCUMENTS 6,661,488 B1    12/2003  Takeda et al.
9,989,813 B2 *  6/2018   Oh ...................... H01L 27/1214
(Continued)

FOREIGN PATENT DOCUMENTS

CN    1211745 A    3/1999
CN    1627171 A    6/2005
(Continued)

OTHER PUBLICATIONS

International Search Report and Written Opinion of PCT Application No. PCT/JP2019/023297, dated Aug. 6, 2019, 09 pages of ISRWO.

*Primary Examiner* — Phu Vu
(74) *Attorney, Agent, or Firm* — Chip Law Group

(57) ABSTRACT

A liquid crystal display apparatus according to the present disclosure includes a first substrate, a second substrate, and a liquid crystal layer. A pixel electrode and a first orientation film are formed on the first substrate. A common electrode and a second orientation film are formed on the second substrate. The liquid crystal layer is disposed between the first orientation film and the second orientation film. The liquid crystal layer within a display area contains a protrusion that does not contribute to formation of a cell gap. The protrusion is formed by a same inorganic material as for an underlying film. An electronic equipment according to the present disclosure includes the liquid crystal display apparatus having the above-described configuration.

13 Claims, 20 Drawing Sheets

(56) References Cited

U.S. PATENT DOCUMENTS

| | | | |
|---|---|---|---|
| 10,032,809 B2 * | 7/2018 | Park | H01L 27/1288 |
| 10,180,609 B2 * | 1/2019 | Jung | G02F 1/1368 |
| 2005/0140916 A1 * | 6/2005 | Kume | G02F 1/133753 |
| | | | 349/156 |
| 2016/0306210 A1 * | 10/2016 | Oh | G02F 1/13394 |
| 2017/0133413 A1 * | 5/2017 | Park | G02F 1/1368 |
| 2017/0192322 A1 * | 7/2017 | Jung | G02F 1/133345 |
| 2018/0052344 A1 * | 2/2018 | Suwa | G02F 1/133707 |
| 2018/0217422 A1 * | 8/2018 | Kojima | G02F 1/133345 |

FOREIGN PATENT DOCUMENTS

| | | |
|---|---|---|
| EP | 884626 A2 | 12/1998 |
| JP | 11-242225 A | 9/1999 |
| JP | 2001-201750 A | 7/2001 |
| JP | 2005-242127 A | 9/2005 |
| KR | 10-1999-0006951 A | 1/1999 |
| KR | 10-2005-0055608 A | 6/2005 |
| TW | 200532302 A | 10/2005 |
| TW | 201636697 A | 10/2016 |
| WO | 2016/152330 A1 | 9/2016 |

\* cited by examiner

BLACK DISPLAY SECTION  WHITE DISPLAY SECTION

OVERHANG OF DOMAIN OVER WHITE DISPLAY SECTION

FIG.6
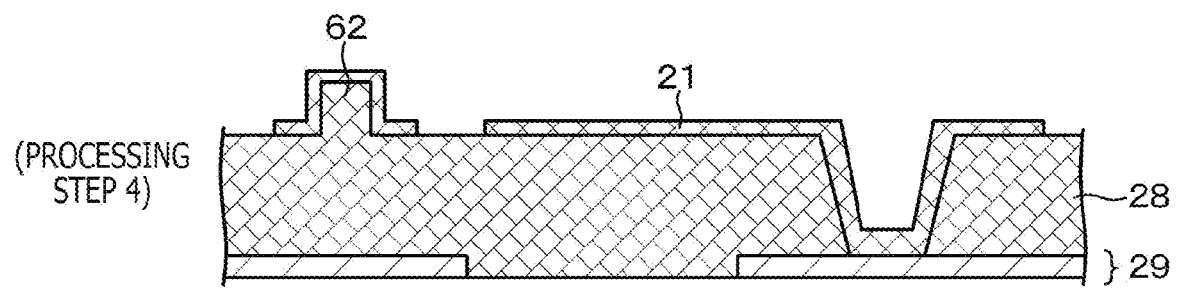
(PROCESSING STEP 4)
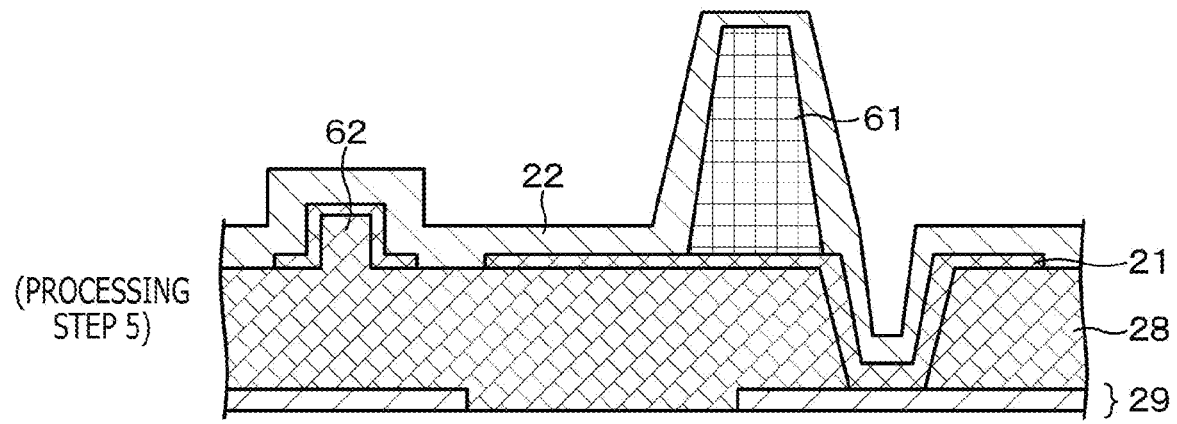
(PROCESSING STEP 5)

F I G . 7
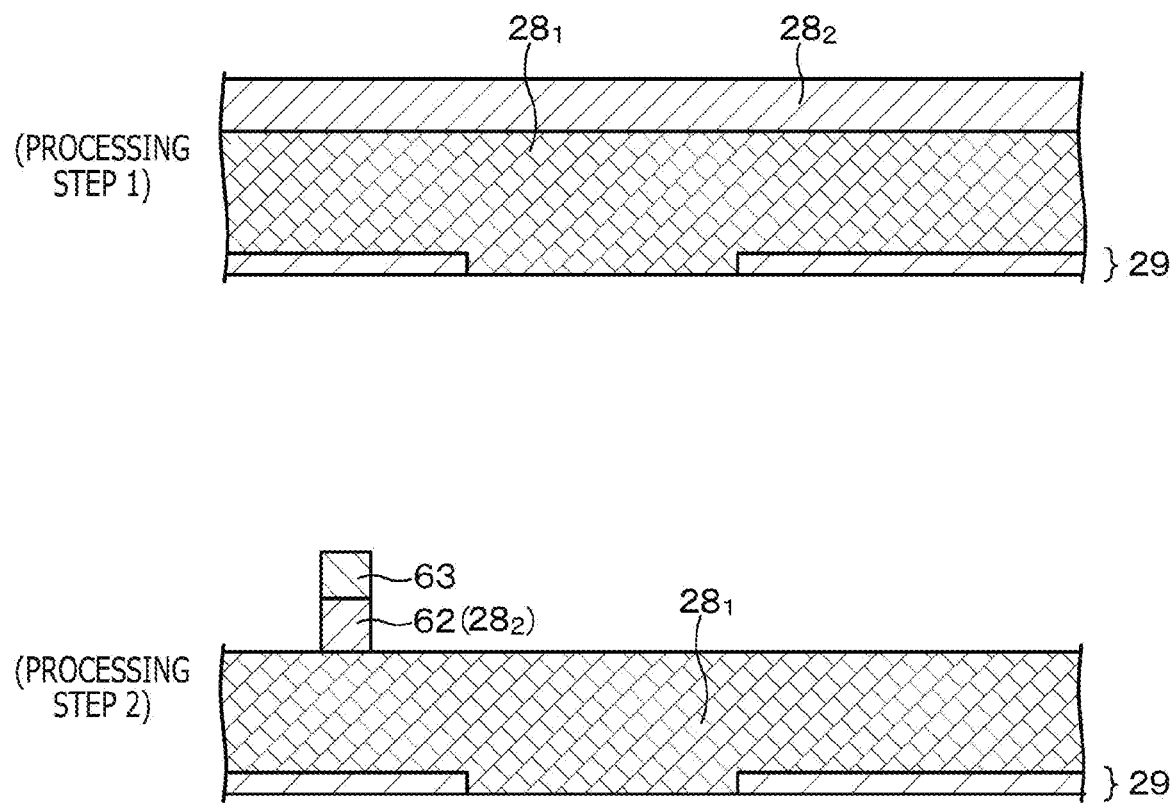

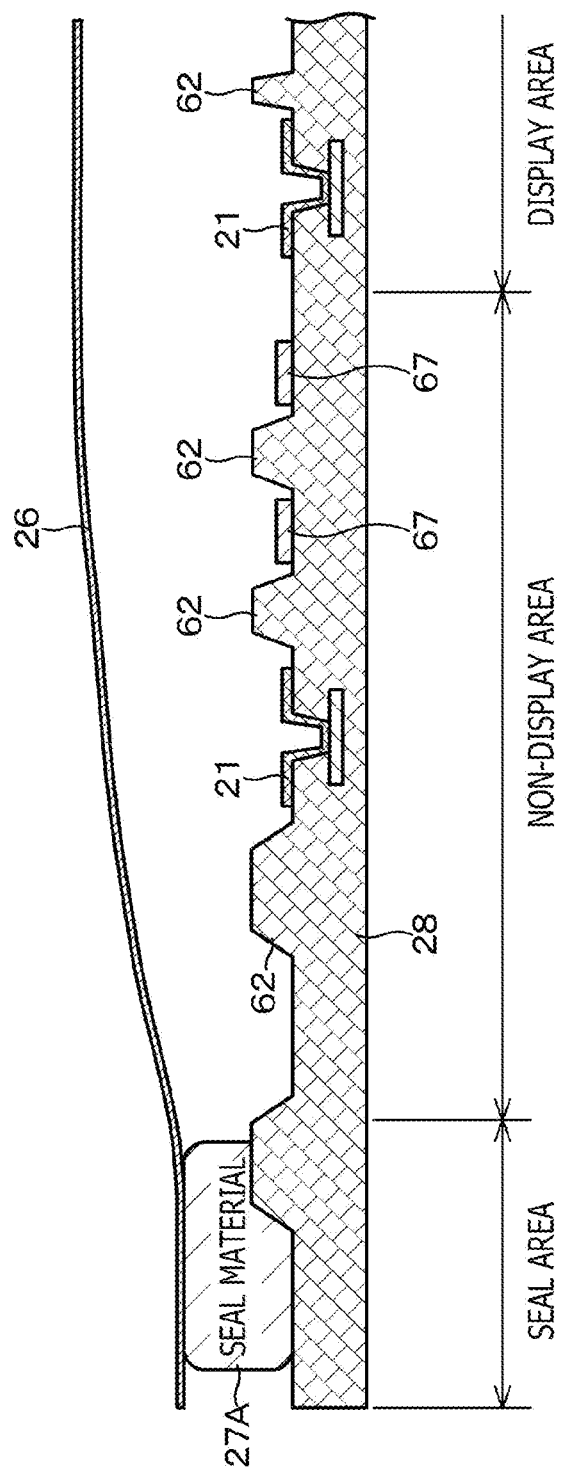

LIQUID CRYSTAL DISPLAY APPARATUS AND ELECTRONIC EQUIPMENT

CROSS REFERENCE TO RELATED APPLICATIONS

This application is a U.S. National Phase of International Patent Application No. PCT/JP2019/023297 filed on Jun. 12, 2019, which claims priority benefit of Japanese Patent Application No. JP 2018-132857 filed in the Japan Patent Office on Jul. 13, 2018. Each of the above-referenced applications is hereby incorporated herein by reference in its entirety.

TECHNICAL FIELD

The present disclosure relates to a liquid crystal display apparatus and electronic equipment.

BACKGROUND ART

The image quality of a liquid crystal display apparatus deteriorates because a liquid crystal domain (disorientation caused by a lateral electric field among pixels) is visible at a display boundary between black and white. A method of physically breaking a domain connection by using a cell gap spacer of a liquid crystal is adopted to suppress image quality deterioration caused by the above-mentioned domain.

However, in a case where, for example, an obliquely vapor-deposited film used as an orientation film, the obliquely vapor-deposited film is formed on the cell gap spacer as well. This causes liquid crystal disorientation and thus degrades contrast (causes light leakage). Light leakage can be effectively reduced by decreasing the diameter of the cell gap spacer. In general, however, the cell gap spacer is lithographically formed by using an organic material. Therefore, it is difficult to decrease the diameter of the cell gap spacer while keeping the height of a cell gap.

Under the above circumstances, a domain suppression protrusion structure having a smaller height than the cell gap spacer is conventionally formed in the same processing step as for the cell gap spacer, and light leakage is reduced by making the height and planar dimensions of a protrusion smaller than those of the cell gap spacer while breaking the domain by using the domain suppression protrusion structure (refer, for example, to PTL 1).

CITATION LIST

Patent Literature

PTL 1
Japanese Patent Laid-open No. 2001-201750

SUMMARY

Technical Problem

The protrusion used in a conventional technology described in PTL 1 above is derived from an organic material that is lithographically patterned at a resolution below the resolution limit. Therefore, shape controllability is insufficient, and the miniaturization of dimensions is limited. Further, miniaturizing the dimensions of the protrusion degrades the interfacial adhesion to an underlying film formed by an inorganic material. This is likely to result in poor formation of the protrusion (collapsed or vanished protrusion) due, for instance, to preliminary cleaning of the liquid crystal. Then, if the protrusion is collapsed, the yield deteriorates due to defective pixels. If the protrusion is vanished, the effect of domain suppression is lost. Consequently, in a case where the conventional technology described in PTL 1 is used, there are limitations to an increase in the aperture of narrowly spaced pixels that requires the miniaturization of elements.

The present disclosure relates to the protrusion for suppressing the domain. An object of the present disclosure is to provide a liquid crystal display apparatus having a protrusion that is excellent in shape controllability and interfacial adhesion to the underlying film formed by an inorganic material. Another object of the present disclosure is to provide electronic equipment having the liquid crystal display apparatus.

Solution to Problem

In accomplishing the above objects, according to an aspect of the present disclosure, there provided a liquid crystal display apparatus including a first substrate, a second substrate, and a liquid crystal layer. A pixel electrode and a first orientation film are formed on the first substrate. A common electrode and a second orientation film are formed on the second substrate. The liquid crystal layer is disposed between the first orientation film and the second orientation film. Within a display area, the liquid crystal layer contains a protrusion that does not contribute to formation of a cell gap. The protrusion is formed by a same inorganic material as for an underlying film.

In accomplishing the above objects, according to another aspect of the present disclosure, there is provided electronic equipment with a liquid crystal display apparatus having the above-described configuration.

BRIEF DESCRIPTION OF DRAWINGS

FIG. 6 is a set of process charts (part 2) illustrating the process of forming the protrusion structure according to the first embodiment.

FIG. 7 is a set of process charts illustrating a part of a process performed in a case where an interlayer insulating film has a multilayer structure.

FIG. 14 is a cut-part end view illustrating a cross-sectional structure of a non-display area of a protrusion structure according to an eighth embodiment.

DESCRIPTION OF EMBODIMENTS

Figure 1:
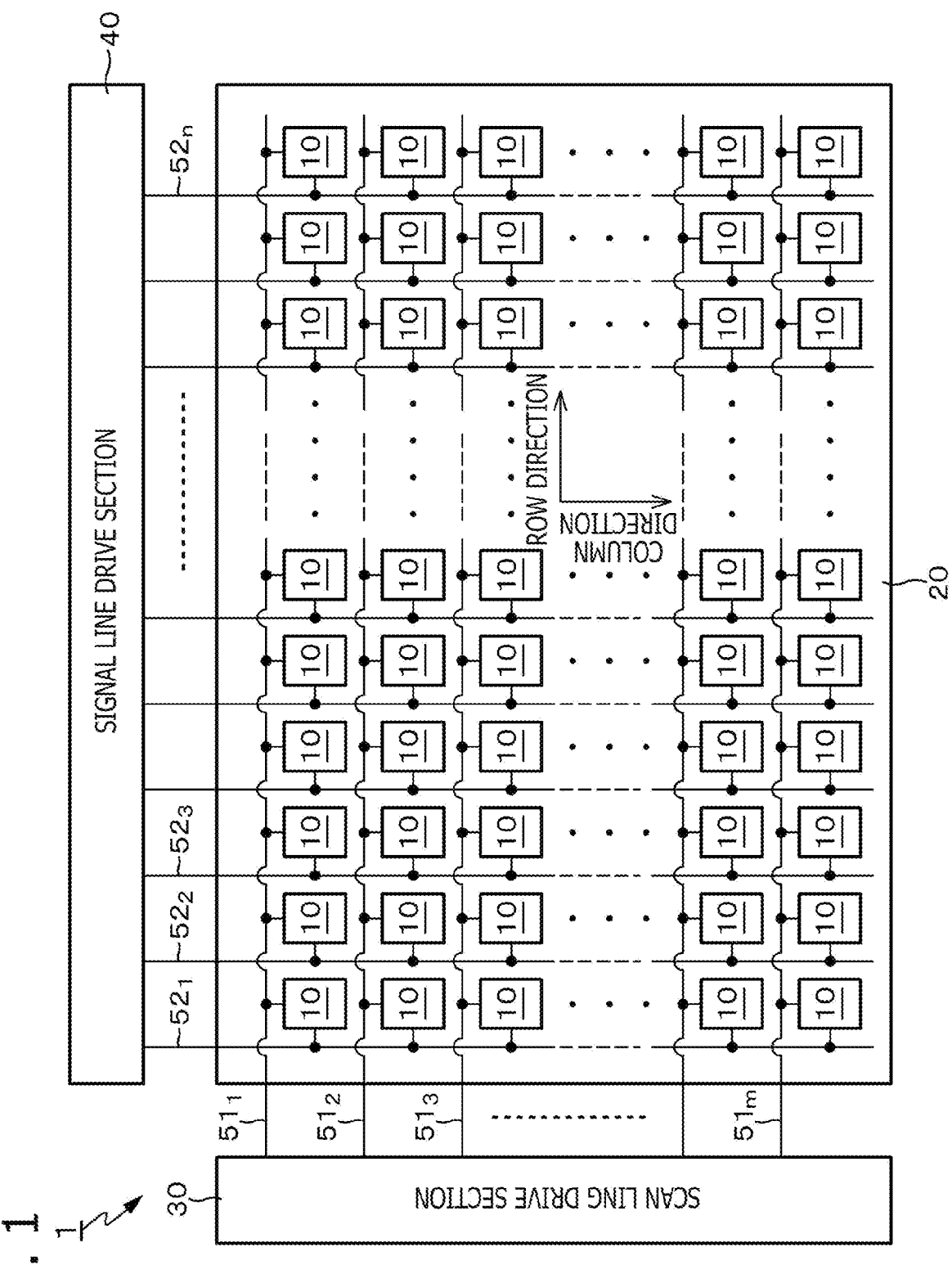
FIG. 1 is a system configuration diagram illustrating an example of a system configuration of an active-matrix liquid crystal display apparatus.

Modes (hereinafter referred to as embodiments) for implementing a technology according to the present disclosure will now be described in detail with reference to the accompanying drawings. The technology according to the present disclosure is not limited to the embodiments. Various numerical values and materials mentioned in conjunction with the embodiments are illustrative and not restrictive. In the following description, identical elements or elements having the same functions are designated by the same reference signs and will not be redundantly described. The description will be given in the following order.

1. Overall Description of Liquid Crystal Display Apparatus and Electronic Equipment According to Present Disclosure
2. Liquid Crystal Display Apparatus to Which Technology According to Present Disclosure Is Applied
3. Basic Configuration of Liquid Crystal Display Apparatus
  3-1. System Configuration
  3-2. Configuration of Liquid Crystal Panel
  3-3. Liquid Crystal Domain
4. Liquid Crystal. Display Apparatus According to Embodiments
  4-1. First Embodiment (Example of Basic Protrusion Structure)
  4-2. Second Embodiment (Example of Protrusion including Recessed Portion)
  4-3. Third Embodiment (Example in Which Flat Base Surface of Protrusion is Positioned Closer to Upper Substrate Surface than Flat Surface of InterLayer Insulating Film Directly below Pixel Electrode)
  4-4. Fourth Embodiment (Example of Alternative Protrusion Shape)
  4-5. Fifth Embodiment (Example in Which Protrusion Is Formed in Overlap with Cell Gap Spacer as Viewed from Above)
  4-6. Sixth Embodiment (Example in Which Protrusion Is Additionally Formed in Non-Display Area in Same Processing Step as for Display Area)
  4-7. Seventh Embodiment (Example in Which Protrusion in Son-Display Area Is Formed to Overlap with and Contain Cell Gap Spacer as Viewed from Above)
  4-8. Eighth Embodiment (Example in Which Protrusion in Son-Display Area Is Formed in Seal Area)
  4-9. Ninth Embodiment (Example in Which Protrusion Is Rectangular in Shape as Viewed from Above)
5. Electronic Equipment according to Present Disclosure
  5-1. First Concrete Example (Example of Projection Display Apparatus)
  5-2. Second Concrete Example (Example of Smartphone)
  5-3. Third Concrete Example (Example of Head-Mounted Display)
  5-4. Fourth Concrete Example (Example of Digital Still Camera)
6. Configurations Supported by Present Disclosure <Overall Description of Liquid Crystal Display Apparatus and Electronic Equipment according to Present Disclosure>

A liquid crystal display apparatus and electronic equipment according to the present disclosure may be configured so that a flat base surface of a protrusion is formed flush with a flat surface of an interlayer insulating film directly below a pixel electrode, or configured so that the flat base surface of the protrusion is positioned closer to a liquid crystal layer than the flat surface of the interlayer insulating film directly below the pixel electrode. Further, the protrusion may alternatively be configured to partly include a recessed portion as viewed from above.

As regards the liquid crystal display apparatus and the electronic equipment according to the present disclosure, which include the above-mentioned preferred configurations, the protrusion may be configured to be disposed in overlap with a light shielding section of a display area as viewed from above. Further, the protrusion may be configured to be disposed in overlap with a cell gap spacer as viewed from above. The cell gap spacer determines a cell gap.

Further, as regards the liquid crystal display apparatus and the electronic equipment according to the present disclosure, which include the above mentioned preferred configurations, the protrusion may be configured to be additionally formed in a non-display area in the same processing step as for the display area. Moreover, the protrusion in the non-display area may be configured to, as viewed from above, be formed not in overlap with a wiring formed in the same processing step as for the pixel electrode. In addition, the protrusion in the non-display area may be configured to be formed to overlap with and contain the cell gap spacer as viewed from above, or configured to be formed in a seal area of the liquid crystal layer.

Further, as regards the liquid crystal display apparatus and the electronic equipment according to the present disclosure, which include the above-mentioned preferred configurations, the protrusion may be configured to be rectangular in shape as viewed from above and disposed along two sides, horizontal and vertical, of a pixel in a light shielding section around the pixel. Furthermore, the protrusion may be configured to be disposed along the vapor deposition direction of an orientation film as viewed from above so as to overhang a part of a pixel aperture.

<Liquid Crystal Display Apparatus to which Technology According to Present Disclosure is Applied>

First of all, the description given below deals with the liquid crystal display apparatus to which the technology according to the present disclosure is applied.

Liquid crystal display apparatuses are classified according to display methods into a transmissive type, a reflective type, and a semi-transmissive type. Further, silicon, a Transparent Oxide Semiconductor (TOS), an organic semiconductor, and the like may be exemplified as materials for a Thin Film Transistor (TFT) used as a pixel.

Furthermore, as a silicon material, a transmissive liquid crystal display apparatus often uses amorphous silicon (non-crystalline semiconductor) or polysilicon (polycrystalline semiconductor). A reflective liquid crystal display apparatus often uses monocrystalline silicon. It should be noted that the polysilicon is classified into a High Temperature Poly-Silicon (HTPS) and a Low Temperature Poly-Silicon (LTPS). The HTPS forms a thin film in an environment where the temperature is 1000° C. or higher. The LTPS forms a thin film in an environment where the temperature is 600° C. or lower.

For a liquid crystal panel, a substrate such as a quartz substrate, a glass substrate, or a silicon substrate is used as the substrate on which liquid crystal is disposed. In general, amorphous silicon transmissive liquid crystal panels and low-temperature polysilicon transmissive liquid crystal panels use a glass substrate, high-temperature polysilicon transmissive liquid crystal panels use a quartz substrate, and monocrystalline silicon reflective liquid crystal panels use a silicon substrate. A device with a liquid crystal disposed on a silicon substrate is generally called an LCOS (Liquid Crystal On Silicon).

A VA (Vertical Alignment) mode and a TN (Twisted Nematic) mode are available as liquid crystal modes (liquid crystal molecule arrangements). In the VA mode, which is normally black, transmittance or reflectance is minimized to display a black screen when no voltage is applied to a liquid crystal. In the TN mode, which is normally white, transmittance or reflectance is maximized to display a white screen when no voltage is applied to the liquid crystal.

Further, a high-temperature polysilicon process, a low-temperature polysilicon process, or an amorphous silicon (a-Si) process is selectable as a TFT process. As regards the liquid crystal panel for a projection display apparatus (projector), the VA mode is often selected as the liquid crystal mode, and an HTPS (high-temperature polysilicon) process is often selected as the TFT process (this is what is generally called an HTPS liquid crystal panel). As regards a small-/medium-sized direct-view liquid crystal panel, the VA mode is often selected as the liquid crystal mode, and an LTPS (low-temperature polysilicon) process is often selected as the TFT process (this is what is generally called an LTPS liquid crystal panel). As regards a large-sized direct-view liquid crystal panel, the VA mode is often selected as the liquid crystal mode, and an amorphous silicon process is often selected as the TFT process (this is what is generally called an a-Si liquid crystal panel).

The technology according to the present disclosure described below is applicable to any one of transmissive, reflective, and semi-transmissive display methods, and also applicable to either of VA or TN liquid crystal modes. Further, the technology according to the present disclosure is applicable no matter which of silicon, a transparent oxide semiconductor, or an organic semiconductor is used as the material for the thin-film transistor.

<Basic Configuration of Liquid Crystal Display Apparatus>

A basic configuration of the liquid crystal display apparatus according to the present disclosure will now be described with reference to an example in which the liquid crystal display apparatus is of an active matrix type. The active-matrix liquid crystal display apparatus is what is generally called an active matrix drive type display apparatus. The active matrix drive type display apparatus is configured so that an independent pixel electrode is disposed for each pixel, and that a switching element is connected to each pixel electrode to selectively drive the pixel.

In the active-matrix liquid crystal display apparatus, the liquid crystal panel is formed by injecting a liquid crystal between two substrates, that is, a first substrate and a second substrate. The first substrate is a TFT substrate that is obtained by forming, for example, a TFT (thin-film transistor) as the switching element. The second substrate is a counter substrate that is obtained by forming color filters, counter electrodes, and the like and is disposed opposite the TFT substrate. Eventually, the liquid crystal panel displays an image by applying a voltage in accordance with switching control, the switching control exercised by the switching element, and a video signal, to control the orientation of the liquid crystal, and thus changing the transmittance of light.

[System Configuration]

FIG. 1 illustrates an example of a system configuration of the active-matrix liquid crystal display apparatus. As illustrated in FIG. 1, the active-matrix liquid crystal display apparatus 1 according to the present example includes a pixel array section 20 and a pixel drive section. The pixel array section 20 is configured so that pixels 10 are two-dimensionally arranged in row and column directions. The pixel drive section drives each the pixels 10 in the pixel array section 20. The pixel drive section includes a scan line drive section 30, a signal line drive section 40, and the like.

The pixel array section 20 is configured so that the pixels are arranged in a matrix of m rows and n columns. As regards the m row pixels and the n column pixels, respective scan lines $51_1$ to $51_m$ are wired for respective pixel rows, and respective signal lines $52_1$ to $52_n$ are wired for respective pixel columns. One end of each scan line 51 is connected to the output end of the associated row in the scan line drive section 30. One end of each signal line 52 is connected to the output end of the associated column in the signal line drive section 40.

[Configuration of Liquid Crystal Panel]

Figure 2:
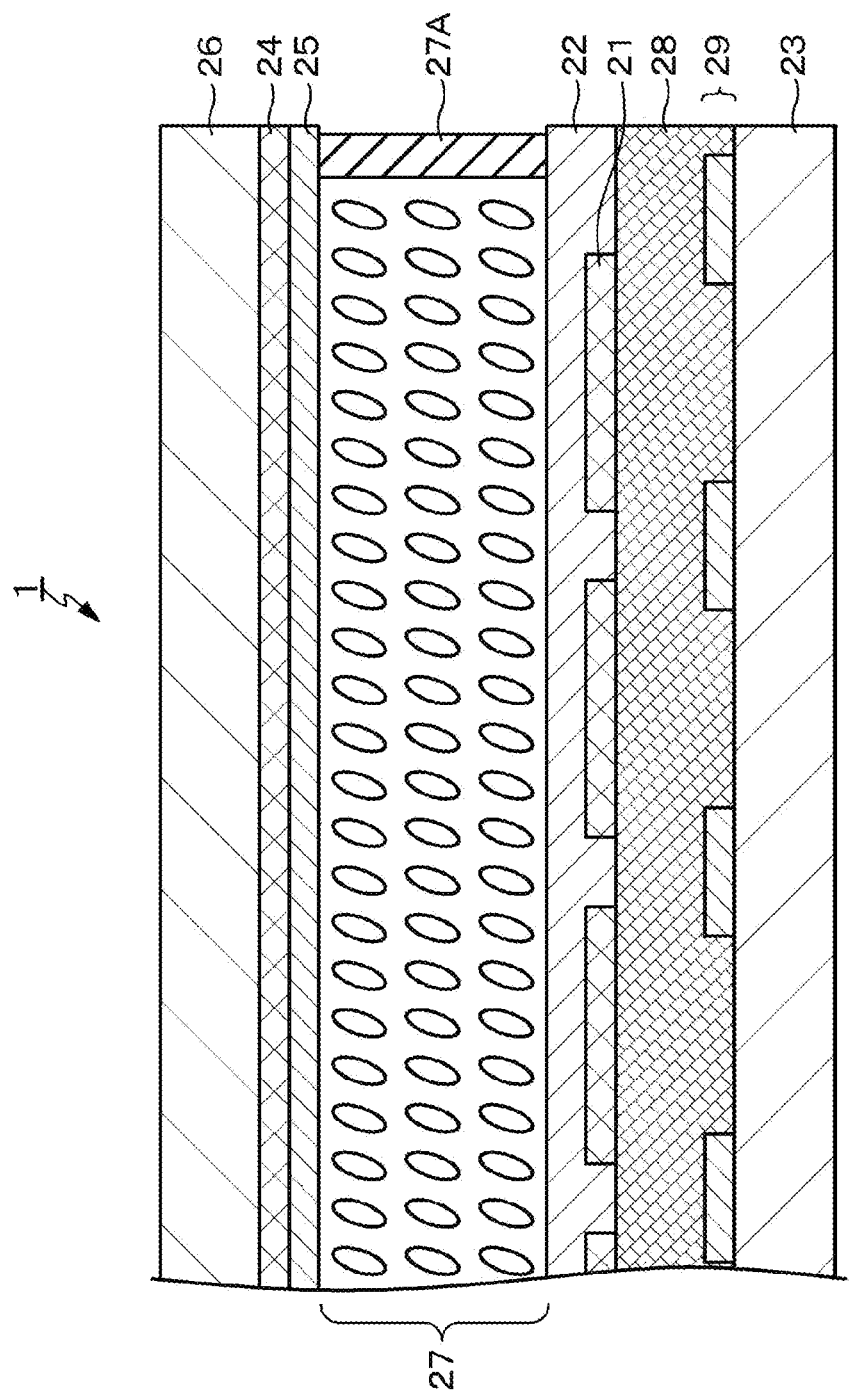
FIG. 2 is a partial schematic cross-sectional view illustrating an example of a basic structure of a display section in a liquid crystal display apparatus.

Next, a basic configuration of a display section (liquid crystal panel) in a transmissive liquid crystal display apparatus 1 will be described as an example with reference to FIG. 2. FIG. 2 is a partial schematic cross-sectional view illustrating an example of a basic structure of the display section in the liquid crystal display apparatus 1.

As illustrated in FIG. 2, the liquid crystal display apparatus 1 is configured so that a liquid crystal layer 27 is sandwiched between a first substrate 23 and a second substrate 26. A pixel electrode 21 and a first orientation film 22 are formed on the inside of the first substrate 23. A common electrode 24 and a second orientation film 25 are formed on the inside of the second substrate 26. The liquid crystal display apparatus 1 has a panel structure (liquid crystal panel) whose periphery is sealed with a seal material 27A. It should be noted that a wiring layer 29 is formed on the first substrate 23. The wiring layer 29 includes the scan lines $51_1$ to $51_m$, the signal lines $52_1$ to $52_n$, and the like. Further, an interlayer insulating film 28 formed by inorganic materials such as silicon oxide and silicon nitride lies between the wiring layer 29 on one hand and the pixel electrode 21 and the first orientation film 22 on the other.

The first substrate 23 is a TFT substrate that is obtained by forming, for example, a TFT (thin-film transistor) as the switching element. The second substrate 26 is a counter substrate that is disposed opposite the first substrate 23. The first substrate 23 and the second substrate 26 are formed by a transparent substrate such as a glass substrate. It should be noted that, although not depicted, a polarizing plate is to be disposed on the outside of the first substrate 23 and on the outside of the second substrate 26.

The liquid crystal layer 27 is formed by injecting a liquid crystal into a gap between the first substrate 23 and the second substrate 26. The pixel electrode 21 and the common electrode 24 are respectively disposed on the facing sides of the first substrate 23 and second substrate 26. It is preferable that the pixel electrode 21 and the common electrode 24 be formed by a transparent conductor such as ITO (indium tin oxide), IZO (indium zinc oxide), or ZnO (zinc oxide).

The first orientation film 22 and the second orientation film 25 are disposed on the inner surfaces of the first substrate 23 and second substrate 26, that is, disposed to cover the surface of the side adjacent to the liquid crystal layer 27 so that liquid crystal molecules contained in the liquid crystal layer 27 are oriented in a predetermined direction.

The liquid crystal panel having the above-described configuration displays an image by applying a voltage between the pixel electrode 21 and the common electrode 24 in accordance with switching control, the switching control exercised by the switching element, and a video signal, to control the orientation of the liquid crystal, and thus changing the transmittance of light.

[Liquid Crystal Domain]

The image quality of the liquid crystal display apparatus deteriorates because the result of disorientation caused by a lateral electric field among pixels, that is, a liquid crystal domain is visible at a display boundary between black and white. The liquid crystal domain can be made hardly visible by disposing a light shielding section including a pixel section wiring and the like, in overlap with an area where the liquid crystal domain occurs.

Meanwhile, it is highly demanded that liquid crystal display apparatuses achieve higher brightness. Particularly, it is necessary that transmissive liquid crystal display apparatuses increase a pixel aperture ratio. Increasing the pixel aperture ratio decreases the area of the light shielding section for making the liquid crystal domain hardly visible. Therefore, as regards narrowly spaced pixels in particular, the liquid crystal domain is in a trade-off relationship with the pixel aperture ratio.

Further, a chain of disorientation can be broken by forming a protruding structure having a certain height in the liquid crystal layer. However, this structure simultaneously causes disorientation of a surrounding liquid crystal. As this causes light leakage, contrast degrades when black is displayed. Degradation of contrast can be suppressed by disposing the protruding structure, that is, the area of light leakage, in overlap with the light shielding section including the pixel section wiring and the like. However, as is the case with the liquid crystal domain, the contrast is also in a trade-off relationship with the pixel aperture ratio. Consequently, it is necessary to achieve a good balance between the liquid crystal domain and the contrast particularly when the aperture of narrowly spaced pixels is large.

Moreover, there is a method of physically breaking a domain connection by using a cell gap spacer of a liquid crystal in order to suppress image quality deterioration caused by the liquid crystal domain. However, in a case where, for example, an obliquely vapor-deposited film is used as an orientation film, an obliquely vapor-deposited film is formed on the cell gap spacer as well. This disturbs the orientation of liquid crystal, and thus degrades the contrast (causes light leakage). Decreasing the diameter of the cell gap spacer is effective for reducing the light leakage. However, in general, the cell gap spacer is lithographically formed by using an organic material. Therefore, it is difficult to decrease the diameter of the cell gap spacer while keeping the distance between cell gaps.

Figure 3A:
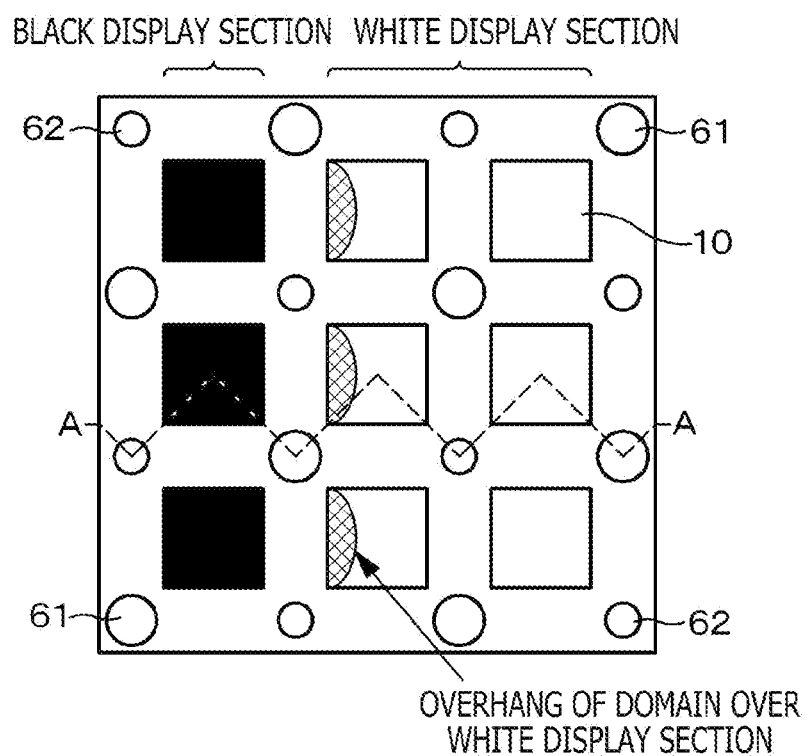
FIG. 3A is a plan view illustrating a protrusion structure according to a conventional example.
Figure 3B:
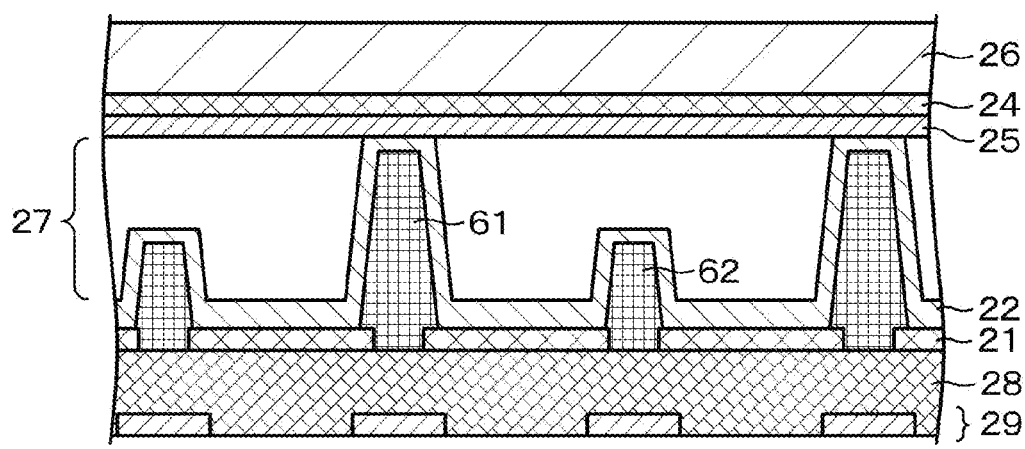
FIG. 3B is a cross-sectional view taken along broken line A-A of FIG. 3A.

Meanwhile, as illustrated in FIGS. 3A and 3B, a protrusion 62 different from a cell gap spacer 61 for determining the distance between the first substrate 23 and the second substrate 26 (hereinafter referred to as the "cell gap") is conventionally formed in the same processing step as for the cell gap spacer 61 (refer to PTL 1). Further, light leakage is reduced by making the height and planar dimensions of the protrusion 62 smaller than those of the cell gap spacer 61 while breaking the connection of the liquid crystal domain by using the above protrusion structure.

However, even in a case where the protrusion structure according to the above conventional example is adopted, the obliquely vapor-deposited film is also formed on the cell gap spacer 61 in a case where, for example, the obliquely vapor-deposited film is used as the first orientation film 22. Therefore, the orientation of liquid crystal is disturbed to degrade the contrast. Further, an organic material lithographically patterned at a resolution below the resolution limit is used as the protrusion 62. Therefore, the controllability of the shape of the protrusion 62 is insufficient, and the miniaturization of dimensions is limited. Furthermore, miniaturizing the dimensions of the protrusion 62 degrades the interfacial adhesion to the underlying interlayer insulating film 28 formed by an inorganic material or to the pixel electrode 21. This is likely to result in poor formation of the protrusion (collapsed or vanished protrusion) due, for instance, to preliminary cleaning of the liquid crystal.

<Liquid Crystal Display Apparatus According to Embodiments>

In view of the above circumstances, the embodiments of the present disclosure are configured so that a protrusion not contributing to the formation of the cell gap is formed in the liquid crystal layer within the display area by using the same inorganic material as for an underlying film directly below an orientation film. More specifically, the underlying film formed by the inorganic material is directly processed so as to form the protrusion for domain suppression in the liquid crystal layer within the display area by using the inorganic material in a CMOS semiconductor process.

Here, the "protrusion not contributing to the formation of the cell gap" denotes a protrusion that is different from the cell gap spacer 61 for determining the cell gap, that is, contributing to the formation of the cell gap. More specifically, the protrusion formed by the inorganic material is shaped so that its height and planar dimensions (dimensions as viewed from above) are smaller than those of the cell gap spacer 61. In a case where the cell gap spacer 61 is not used, the protrusion formed by the inorganic material has a height less than the cell gap height of the display section. Domain suppression can be achieved by the action of this protrusion.

When a protrusion formation method based on a generally used inorganic film processing technology is adopted for the CMOS semiconductor process, a more miniaturized protrusion structure can be formed than that in a conventional technology that does not use the above protrusion formation method. This provides excellent controllability of the shape of the protrusion and miniaturizes the dimensions of the protrusion. Therefore, light leakage can be reduced. Further, forming the protrusion by using the same inorganic material as for the underlying film makes it possible to form a protrusion structure for domain suppression that is excellent in the interfacial adhesion to the film underlying the protrusion. As a result, domain suppression can be achieved to suppress domain-induced image quality deterioration. This makes it possible to not only provide image quality improvement but also resolve the trade-off between the liquid crystal domain and the contrast and the pixel aperture ratio.

The following detailed description deals with the embodiments of the present disclosure for implementing a protrusion structure for domain suppression that is excellent in the controllability of the shape of the protrusion for domain suppression and in the interfacial adhesion to the underlying film formed by an inorganic material.

The following embodiments will be described with reference to an example case where the protrusion structure for domain suppression is formed on the side of the first substrate 23, which is a TFT substrate. However, the protrusion structure may alternatively be formed on the side of the second substrate 26, which is a counter substrate, or formed on the both sides.

First Embodiment

Figure 4A:
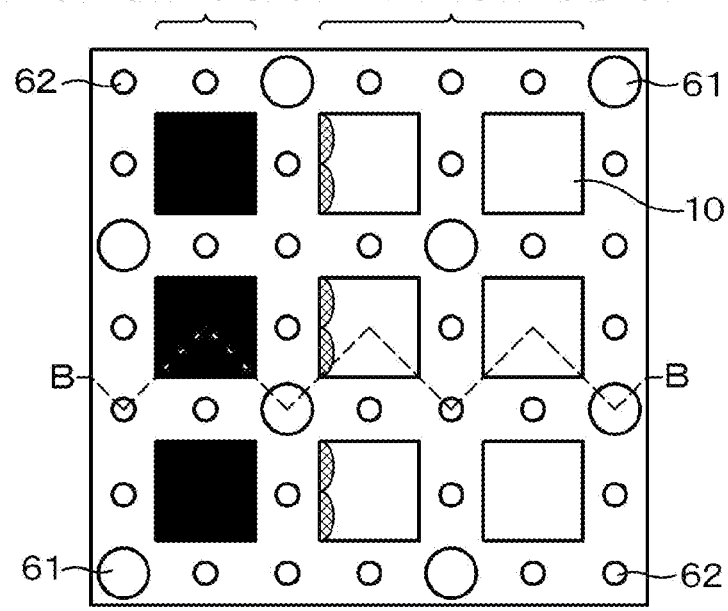
FIG. 4A is a plan view illustrating a protrusion structure according to a first embodiment.
Figure 4B:
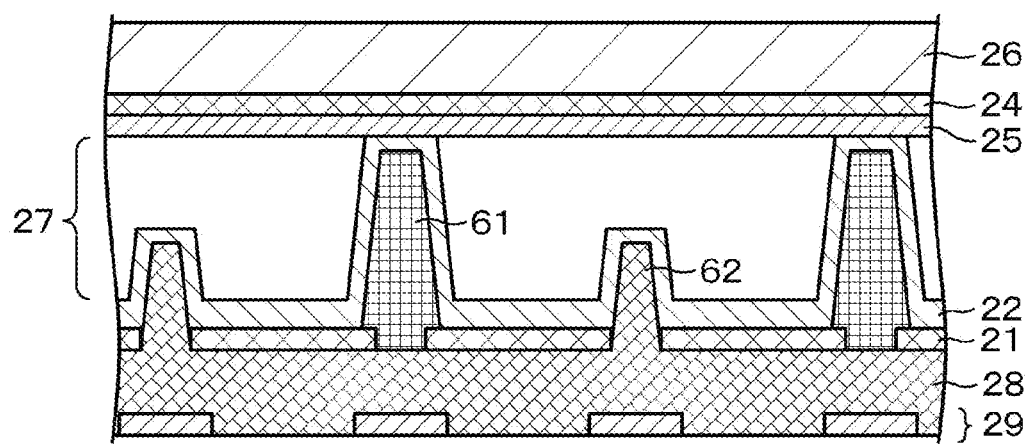
FIG. 4B is a cross-sectional view taken along broken line B-B of FIG. 4A.

A first embodiment is an example of a basic protrusion structure according to the present disclosure. FIG. 4A is a plan view illustrating a protrusion structure according to the first embodiment. FIG. 4B is a cross-sectional view taken along broken line B-B of FIG. 4A.

In the liquid crystal display apparatus, which is configured so that the first substrate 23 and the second substrate 26 are disposed opposite to each other, and that the liquid crystal layer 27 is formed by injecting a liquid crystal into the gap between the first and second substrates 23 and 26, the liquid crystal layer 27 contains the cell gap spacer 61 that is disposed at predetermined intervals for determining the cell gap (i.e., contributing to the formation of the cell gap).

In the liquid crystal display apparatus having the above-described configuration according to the present embodiment, the protrusion 62 for domain suppression is formed in the liquid crystal layer 27 by using the same inorganic material as for the underlying interlayer insulating film 28. As illustrated in FIG. 4A, a large number of protrusions 62 are formed in overlap with the light shielding section around the pixels 10 in the display area (effective pixel area) as viewed from above. Silicon oxide, silicon nitride, and the like may be exemplified as inorganic materials for the interlayer insulating film 28 and the protrusion 62.

The protrusion 62 is formed in the CMOS semiconductor process by applying the generally used inorganic film processing technology in such a manner that the height and planar dimensions of the protrusion 62 are smaller than those of the cell gap spacer 61. As the height of protrusion 62 is less than the height of the cell gap spacer 61, the protrusion 62 does not contribute to the formation of the cell gap. It is preferable that the protrusion 62 be sized to have a height approximately equal to or less than half the height of the cell gap spacer 61 and have planar dimensions approximately equal to or smaller than half the planar dimensions of the cell gap spacer 61.

When the generally used inorganic film processing technology is applied to the CMOS semiconductor process, the protrusion structure according to the first embodiment makes it possible to provide excellent controllability of the shape of the protrusion 62 and miniaturize the dimensions of the protrusion 62. Therefore, light leakage can be reduced. Further, as microfabrication is made achievable, a large number of protrusions 62 can also be formed in the light shielding section including the wiring layer 29, which is miniaturized by increasing the aperture of the pixels 10, as depicted in FIG. 4A. This enhances the effect of domain suppression. Furthermore, poor formation of the protrusion 62 can be reduced by directly processing the interlayer insulating film 28 including an inorganic material and forming the protrusion 62 including the inorganic material. This makes it possible to improve the image quality and the yield.

Figure 5:
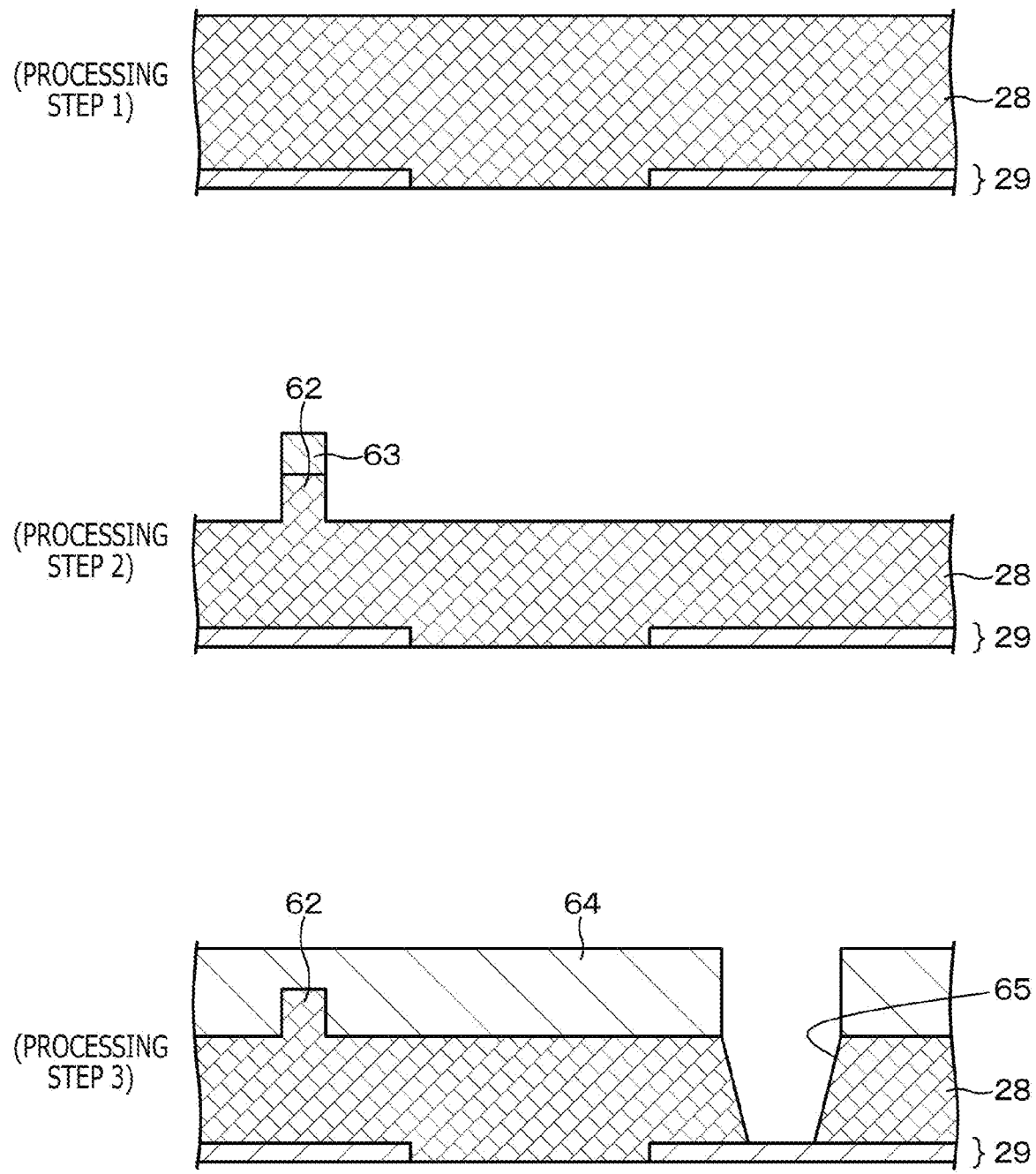
FIG. 5 is a set of process charts (part 1) illustrating a process of forming the protrusion structure according to the first embodiment.

A process of forming the protrusion structure according to the first embodiment will now be described with reference to process charts in FIGS. 5 and 6. The protrusion structure formation process described below is performed by applying the generally used inorganic film processing technology to the CMOS semiconductor process. The same holds for the other embodiments described later.

(Processing Step 1)

A CVD (Chemical Vapor Deposition) method, a sputtering method, or the like is used to form a metal film such as a tungsten (W), molybdenum (Mo), titanium (Ti), aluminum (Al), or copper (Cu) film, or an alloy film including these metals on the TFT substrate (first substrate 23) depicted in FIG. 2, and then patterning is performed to form the wiring layer 29.

Subsequently, the CVD method or the like is used to form an inorganic film such as a film of silicon oxide or a film of silicon nitride, or a multilayer film including these substances, in such a manner as to obtain the interlayer insulating film 28 having a film thickness, for example, of approximately 200 to 2000 nm. The interlayer insulating film 28 is flattened as needed by using a method such as CMP (Chemical Mechanical Polishing).

(Processing Step 2)

Next, a resist 63 is formed on the interlayer insulating film 28 so as to cover a protrusion formation area. The resist 63 is then used as a mask to form the protrusion 62 by RIE (Reactive Ion Etching) or wet etching. It is preferable that the protrusion 62 be formed in overlap with the light shielding section as viewed from above, and that the planar dimensions of the protrusion 62 be approximately equal to or smaller than a light shielding width. In the present example, the wiring layer 29 is used as the light shielding section so that the protrusion 62 is disposed in overlap with the wiring layer 29. However, the overlapping target is not limited to the wiring layer 29. The protrusion 62 may alternatively be disposed in overlap with any light shielding area.

(Processing Step 3)

Next, the resist 63 for forming the protrusion 62 is peeled off, and then a resist 64 is used as a mask to form a contact hole 65 reaching the wiring layer 29 in the interlayer insulating film 28. The order in which the protrusion 62 and the contact hole 65 are formed may be reversed. However, forming the contact hole 65 after the formation of the protrusion 62 is advantageous in terms of processing because the thickness of the interlayer insulating film 28 can be reduced.

(Processing Step 4)

Next, the resist 64 for forming the contact hole 65 is peeled off, and then a pixel electrode material is formed into a film and patterned to form the pixel electrode 21. In the present example, the pixel electrode material is used to connect to the wiring layer 29. However, an alternative is to form an additional conductive film (not depicted) in the contact hole 65 and connect the pixel electrode 21 to the wiring layer 29 via the additional conductive film. Further, in the present example, patterning is performed in such a manner that the pixel electrode material remains on the protrusion 62. However, an alternative is to remove the pixel electrode material or connect it to the pixel electrode 21.

(Processing Step 5)

Next, the cell gap spacer 61 is formed, and then the first orientation film 22 is formed. The cell gap spacer 61 need not always be formed depending on the process of cell gap formation with respect to the counter substrate (second substrate 26) depicted in FIG. 2. Even in a case where the cell gap spacer 61 is formed, it may be formed only in an area other than the effective pixel area.

As is obvious from the above explanation, the protrusion structure according to the first embodiment is configured so that the protrusion 62 for domain suppression is formed integrally with the interlayer insulating film 28 directly below the orientation film (first orientation film 22) by using the same inorganic material as for the interlayer insulating film 28. As is obvious from FIG. 6, this ensures that the flat base surface of the protrusion 62 is formed flush with the flat surface of the interlayer insulating film 28, which is an underlying film directly below the pixel electrode 21.

It should be noted that, in the protrusion structure according to the first embodiment, the interlayer insulating film 28 formed by an inorganic material has a single layer structure. However, the structure of the inter layer insulating film 28 is not limited to the single layer structure. An alternative is to adopt a multilayer structure that is formed by stacking a plurality of interlayer insulating films. For example, in a case where the adopted multilayer structure is formed by stacking a first interlayer insulating film $28_1$ and a second interlayer insulating film $28_2$, which are formed by an inorganic material, as depicted in FIG. 7, the height of the protrusion 62 can be controlled with ease by making use of the etching selectivity difference between the above two interlayer insulating films $28_1$ and $28_2$. FIG. 7 is a set of process charts illustrating a part of a process performed in a case where the interlayer insulating film 28 has a multilayer structure. Processing steps 1 and 2 in FIG. 7 correspond to processing steps 1 and 2 in FIG. 5.

Second Embodiment

Figure 8:
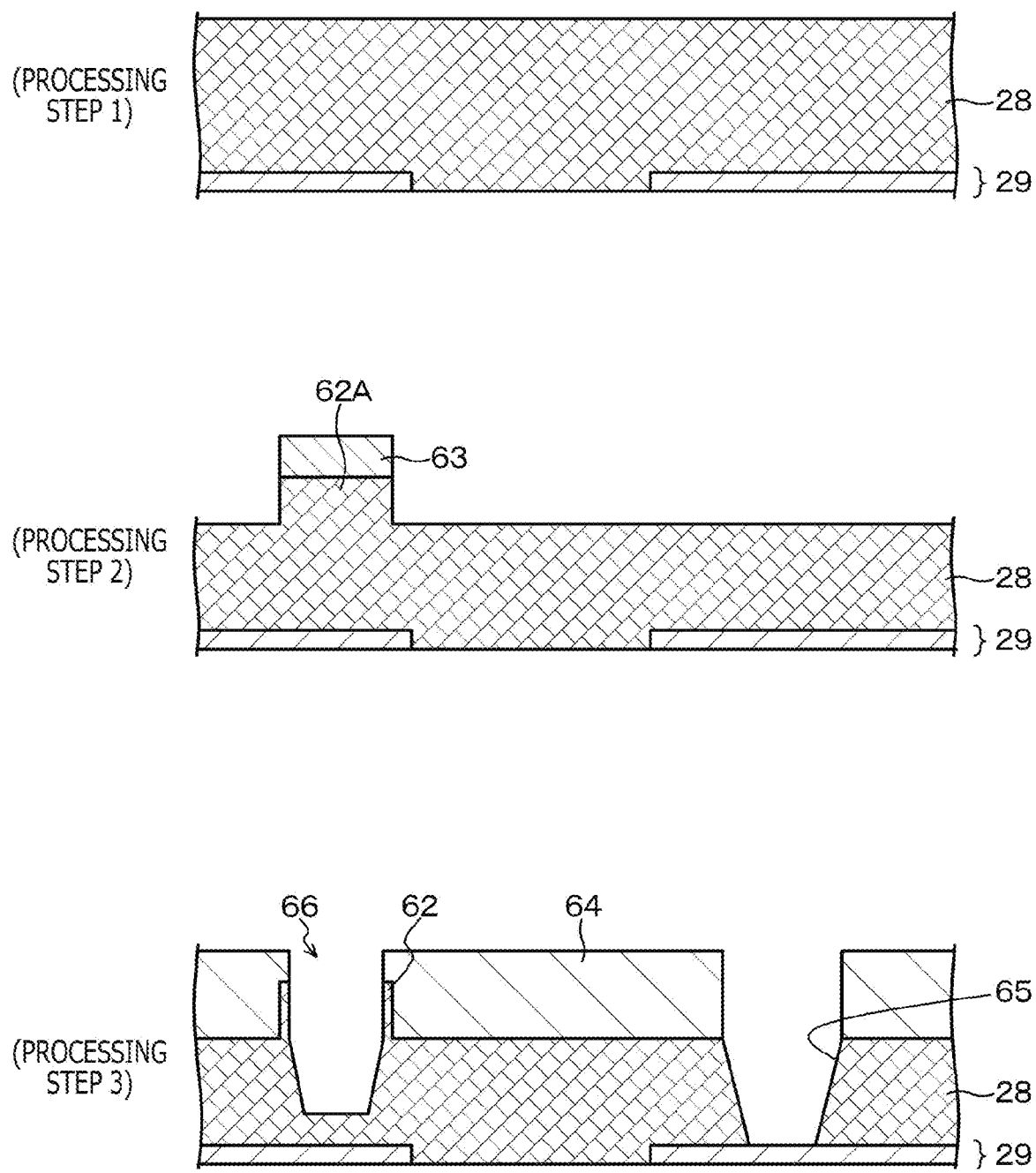
FIG. 8 is a set of process charts illustrating essential parts of a process performed to form a protrusion structure according to a second embodiment.

A second embodiment is a modified example of the first embodiment. In the second embodiment, a recessed portion is disposed at the center of the protrusion 62 as viewed from above. FIG. 8 is a set of process charts illustrating essential parts of a process performed to form a protrusion structure according to the second embodiment. The following description deals with the process of forming the protrusion structure according to the second embodiment.

(Processing Step 1)

As is the case with processing step 1 in the first embodiment, a method such as the CVD or sputtering is used to form a metal film such as a W, Mo, Ti, Al, or Cu film, or an alloy film including these metals, and then patterning is performed to form the wiring layer 29. Next, the interlayer insulating film 28 is formed by performing the CVD method or the like on inorganic films or a multilayer film derived from the inorganic films. Subsequently, the interlayer insulating film 28 is flattened as needed by using a method such as the CMP.

(Processing Step 2)

Next, the resist 63 is formed on the interlayer insulating film 28 so as to cover the area where the protrusion 62 is formed. The resist 63 is then used as a mask to form a protruding portion 62A by RIE or wet etching. The protruding portion 62A is formed in overlap with the light shielding section as viewed from above. In this respect, the second embodiment is similar to the first embodiment.

(Processing Step 3)

Next, as is the case with processing step 3 in the first embodiment, the contact hole 65 reaching the wiring layer 29 in the interlayer insulating film 28 is formed by using the resist 64 as a mask. In this instance, the resist 64 is opened to form a recessed portion 66 in the protruding portion 62A in overlap with the protruding portion 62A formed in processing step 2 as viewed from above. As a result, the protrusion 62 for domain suppression is formed in an area defined by removing the recessed portion 66 from the protruding portion 62A.

Subsequently, processing is performed to form the pixel electrode 21, the cell gap spacer 61, and the first orientation film 22. This processing is basically the same as the processing performed in processing steps 4 and 5 in the first embodiment.

As is obvious from the above explanation, the protrusion structure according to the second embodiment is such that the recessed portion 66 is disposed at the center of the protrusion 62 as viewed from above by combining a process of forming the protrusion 62 and a process of forming the contact hole 65. It should be noted that the case where the recessed portion 66 is disposed at the center as viewed from above is exemplified here. However, the position where the recessed portion 66 is disposed is not limited to the center as viewed from above. For example, the recessed portion 66 may alternatively be disposed in such a manner that only a left portion depicted in the figure remains. In short, it is sufficient that a part of the protrusion 62 include the recessed portion 66 as viewed from above. As described above, the dimensions of the protrusion 62 for domain suppression can be miniaturized by disposing the recessed portion 66 on the protrusion 62. Therefore, light leakage can be reduced more reliably.

Third Embodiment

Figure 9:
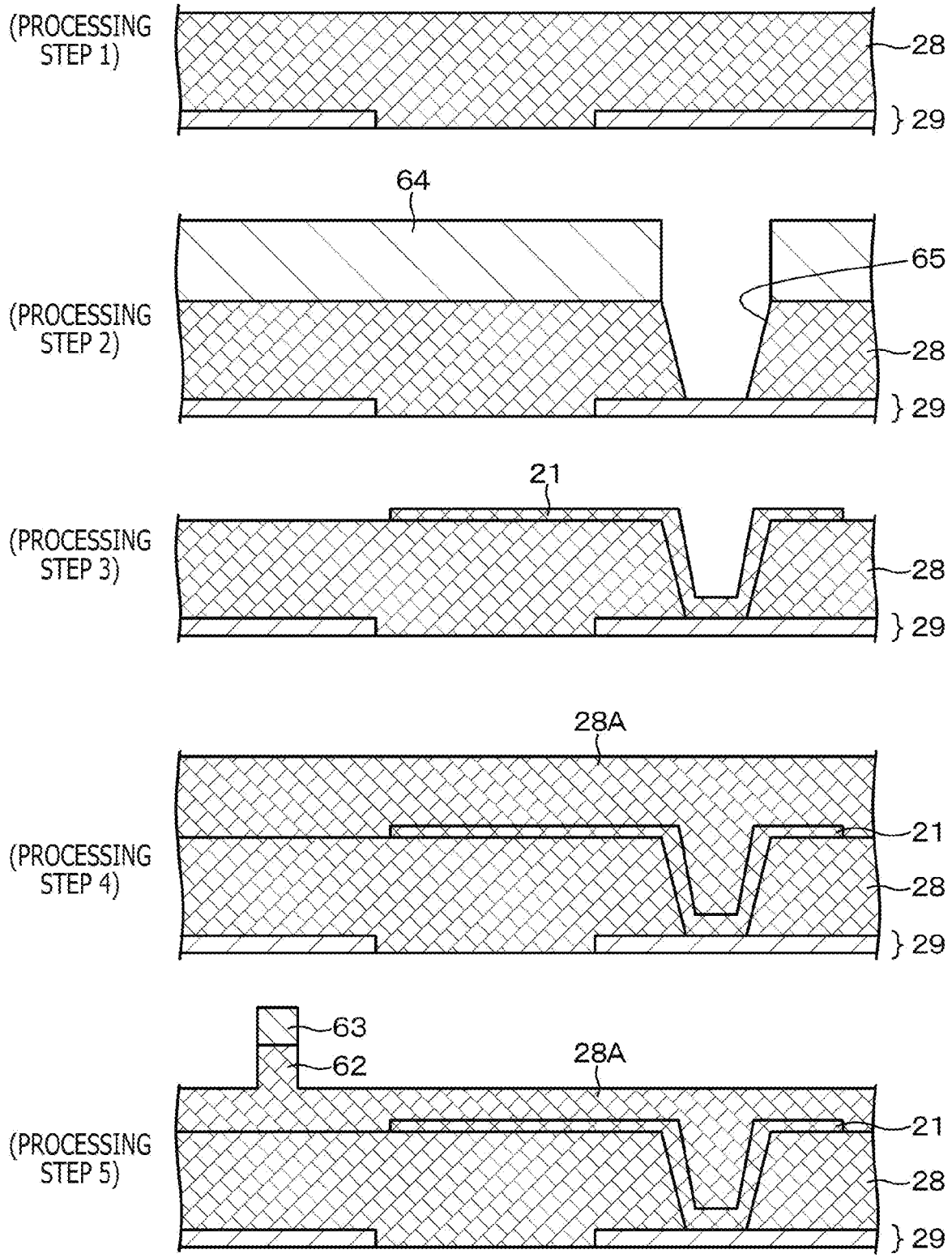
FIG. 9 is a set of process charts illustrating essential parts of the process performed to form a protrusion structure according to a third embodiment.

A third embodiment is a modified example of the first embodiment. In the third embodiment, the flat base surface of the protrusion 62 is positioned closer to the upper substrate surface (closer to the liquid crystal layer 27) than the flat surface of the interlayer insulating film 28 directly below the pixel electrode 21. FIG. 9 is a set of process charts illustrating essential parts of the process performed to form a protrusion structure according to the third embodiment. The following description deals with the process of forming the protrusion structure according to the third embodiment.

(Processing Step 1)

As is the case with processing step 1 in the first embodiment, a method such as the CVD or sputtering is used to form a metal film such as a W, Mo, Ti, Al, or Cu film, or an alloy film including these metals, and then patterning is performed to form the wiring layer 29. Subsequently, the interlayer insulating film 28 is formed by performing the CVD method or the like on inorganic films or a multilayer film derived from the inorganic films.

(Processing Step 2)

Next, as is the case with processing step 3 in the first embodiment, the contact hole 65 reaching the wiring layer 29 in the interlayer insulating film 28 is formed by using the resist 64 as a mask.

(Processing Step 3)

Next, as is the case with processing step 4 in the first embodiment, the resist 64 is peeled off, and then the pixel electrode material is formed into a film and patterned to form the pixel electrode 21.

(Processing Step 3)

Next, the CVD method or the like is used to form an inorganic film such as a film of silicon oxide or a film of silicon nitride, or a multilayer film including these substances, in such a manner as to obtain an interlayer insulating film 28A having a film thickness, for example, of approximately 100 to 2000 nm. The interlayer insulating film 28A is flattened as needed by using the method such as CMP.

(Processing Step 4)

Next, as is the case with processing step 2 in the first embodiment, the resist 63 is formed on the interlayer insulating film 28A so as to cover the area where the protrusion 62 is formed. The resist 63 is then used as a mask to form the protrusion 62 by RIE or wet etching.

As is obvious from the above explanation, the protrusion structure according to the third embodiment is such that the protrusion 62 is formed by using the inter layer insulating film 28A formed on the pixel electrode 21. Therefore, the flat base surface of the protrusion 62 is positioned closer to the liquid crystal layer 27 than the flat surface of the interlayer insulating film 28, which is an underlying film directly below the pixel electrode 21. As described above, the protrusion 62 is formed in such a manner that the flat base surface of the protrusion 62 is positioned closer to the liquid crystal layer 27 than the flat surface of the interlayer insulating film 28. Consequently, the protrusion 62 is positioned in a layer above the layer where the pixel electrode 21 is formed. This makes it possible to ease the restrictions on the position of the protrusion 62 relative to the pixel electrode 21.

Fourth Embodiment

Figure 10A:
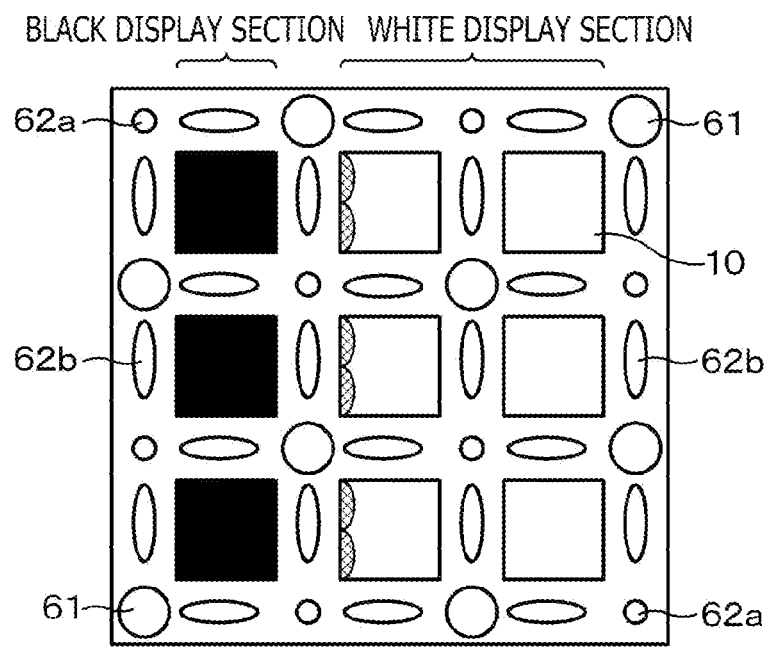
FIG. 10A is a plan view illustrating a first example of a protrusion shape of a protrusion structure according to a fourth embodiment.
Figure 10B:
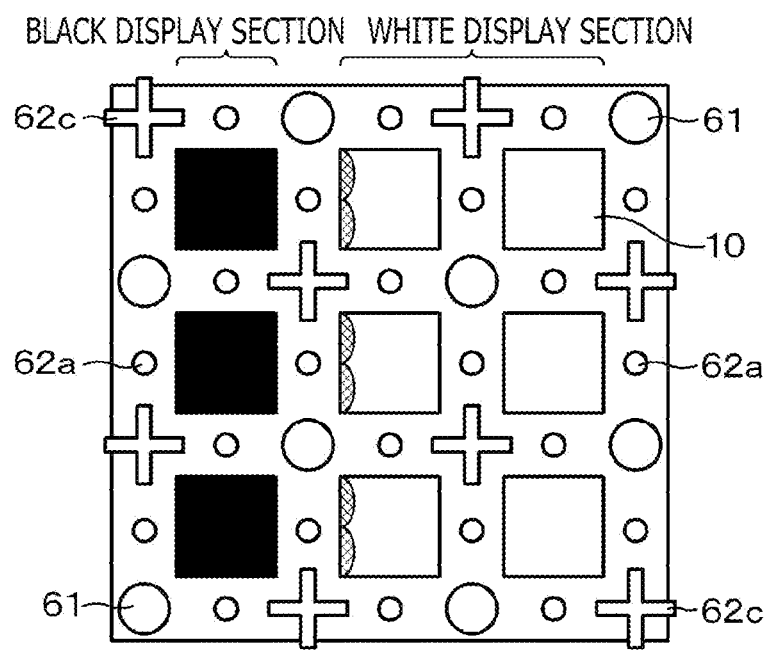
FIG. 10B is a plan view illustrating a second example of the protrusion shape.

A fourth embodiment is a modified example of the first to third embodiments. The fourth embodiment deals with an example of the shape of the protrusion 62 that is disposed in overlap with the light shielding section of the display area (effective pixel area) as viewed from above. FIGS. 10A and 10B are plan views illustrating first and second examples of the shape of the protrusion 62 of a protrusion structure according to the fourth embodiment.

First Example

As illustrated in FIG. 10A, a protrusion shape according to the first example is such that, while the cell gap spacer 61 in the light shielding section around the pixels 10 in the display area is disposed at positions on one diagonal line in a corner of a pixel 10, a protrusion 62a shaped like a circle as viewed from above is disposed at positions on the other diagonal line in a corner of the pixel 10. Further, a protrusion 62b shaped like an ellipse as viewed from above is disposed at positions corresponding to the four sides of the pixel 10. In other words, the protrusion shape according to the first example is such that the protrusion 62a shaped like a circle as viewed from above is combined with the protrusion 62b shaped like an ellipse as viewed from above.

Second Example

As illustrated in FIG. 10B, the protrusion shape according to the second example is such that, while the cell gap spacer 61 is disposed at positions on one diagonal line in a corner of a pixel 10, a protrusion 62c shaped like a cross as viewed from above is disposed at positions on the other diagonal line in a corner of the pixel 10. Further, the protrusion 62a shaped like a circle as viewed from above is disposed at positions corresponding to the four sides of the pixel 10. In other words, the protrusion shape according to the second example is such that the protrusion 62a shaped like a circle as viewed from above is combined with the protrusion 62c shaped like a cross as viewed from above.

As described above, light leakage can be reduced by disposing the protrusions 62a, 62b, and 62c, which are variously shaped, in overlap with the light shielding section around the pixels 10 in the display area as viewed from above. Further, the effect of domain suppression can be enhanced by forming a plurality of protrusions 62 (62a, 62b, and 62c) for each pixel.

It should be noted that the shape of the protrusion 62 as viewed from above is the combination of a circle and an ellipse in the first example and the combination of a circle and a cross in the second example. However, the shape of the protrusion 62 as viewed from above is not limited to such combinations. Alternatively, the combination of a circle, an ellipse, and a cross may be used as the shape of the protrusion 62 as viewed from above. Further, the shape of the protrusion 62 as viewed from above is not limited to a circle, an ellipse, and a cross. An alternative is to use a different shape (e.g., a rectangle) or use a shape obtained by combining a different shape with the above-mentioned combination.

Fifth Embodiment

Figure 11A:
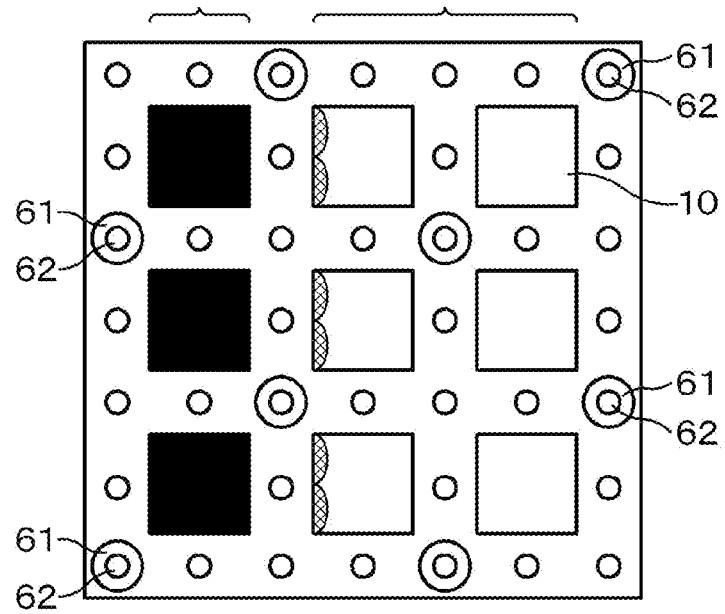
FIG. 11A is a plan view illustrating a protrusion structure according to a fifth embodiment.
Figure 11B:
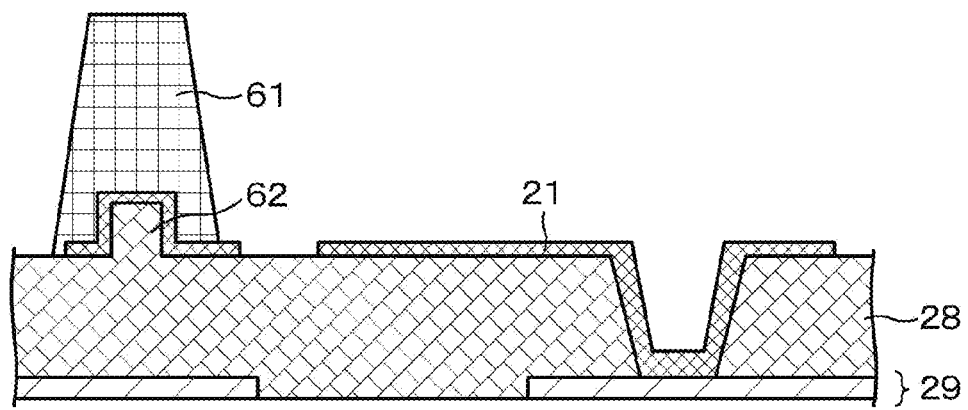
FIG. 11B is a cut-part end view illustrating a cross-sectional structure of essential parts of FIG. 11A.

A fifth embodiment is a modified example of the first embodiment. In the fifth embodiment, the protrusion 62 is formed in overlap with the cell gap spacer 61 as viewed from above. FIG. 11A is a plan view illustrating a protrusion structure according to the fifth embodiment. FIG. 11B is a cut-part end view illustrating essential parts of FIG. 11A.

As illustrated in FIGS. 11A and 11B, the protrusion structure according to the fifth embodiment is such that, the protrusion 62 shaped, for example, like a circle as viewed from above is disposed in overlap with the cell gap spacer 61 that is disposed, for example, at positions on one diagonal line in a corner of a pixel 10. As the adopted configuration is as described above, the number of disposed protrusions 62 can be increased by the number of cell gap spacers 61 as compared to a case where the protrusion structure according to the first embodiment is used (see FIGS. 4A and 4B).

It should be noted that, referring to FIG. 11B, the pixel electrode material on the protrusion 62 may be left on the protrusion 62, removed, or connected to the pixel electrode 21.

The area of contact with a film underlying the cell gap spacer 61 can be increased by disposing the protrusion 62 in overlap with the cell gap spacer 61 as viewed from above in the manner described above. This makes it possible to inhibit the cell gap spacer 61 from collapsing during, for example, preliminary cleaning of liquid crystal. Further, as this makes it easier to miniaturize the cell gap spacer 61, light leakage can be reduced more reliably.

Sixth Embodiment

Figure 12A:
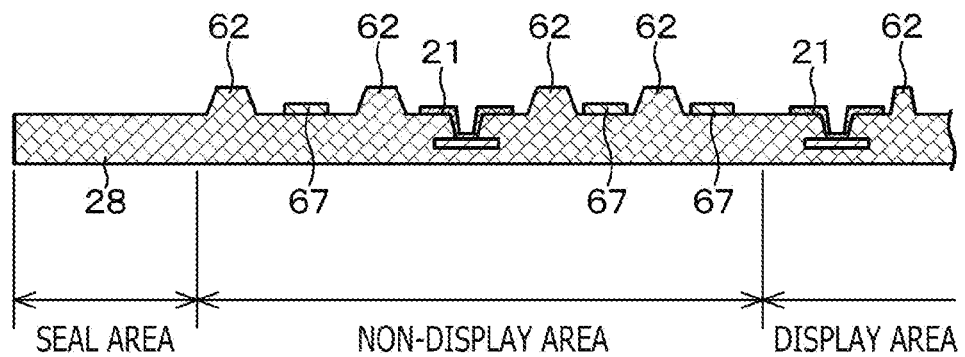
FIG. 12A is a cut-part end view illustrating a cross-sectional structure of a non-display area of a protrusion structure according to a sixth embodiment.
Figure 12B:
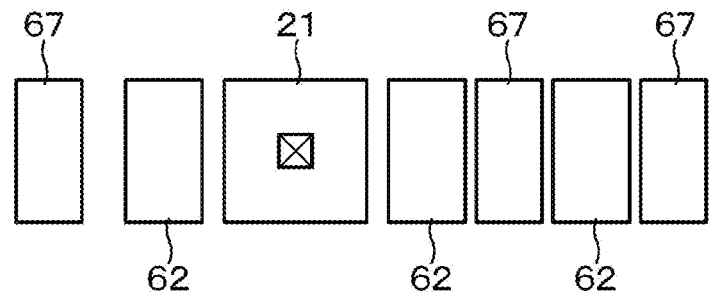
FIG. 12B is a plan view illustrating essential parts of FIG. 12A.

A sixth embodiment is an example in which the protrusion 62 for domain suppression is additionally formed in the non-display area in the same processing step as for the display area. FIG. 12A is a cut-part end view illustrating a cross-sectional structure of a non-display area of a protrusion structure according to the sixth embodiment. FIG. 12B is a plan view illustrating essential parts of FIG. 12A.

As illustrated in FIGS. 12A and 12B, the protrusion structure according to the sixth embodiment is configured so that the protrusion 62 is formed in the non-display area in the same processing step as for the display area. Dummy pixels, etc., are formed in the non-display area, which does not contribute to image display. The protrusion 62 in the non-display area is formed not in overlap with a wiring 67 in the non-display area as viewed from above. The wiring 67 is formed in the same processing step as for the pixel electrode 21.

Since the resist coverage at the time of formation of the protrusion 62 can be increased by additionally forming the protrusion. 62 in the non-display area in the same processing step as for the display area in the manner described above, controllability of processing of the protrusion 62 can be enhanced. It is apprehended that disconnection may occur in the above instance if a pixel electrode wiring overhangs the protruding portion. Therefore, the protrusion 62 is formed in such a manner that it is not positioned in overlap with the wiring 67 in the non-display area as viewed from above. Incidentally, in the third embodiment, no restrictions are imposed on the position of the protrusion 62 relative to the pixel electrode wiring. For example, in a case a $SiO_2$ film is etched, $SiFx$ and $O_2$ are emitted when processing is performed by using a CF radical. In this case, $O_2$ reacts with the resist to increase the resist processing rate. Therefore, if the resist coverage is low, the resist cannot be kept. This results in insufficient processability.

Seventh Embodiment

Figure 13:
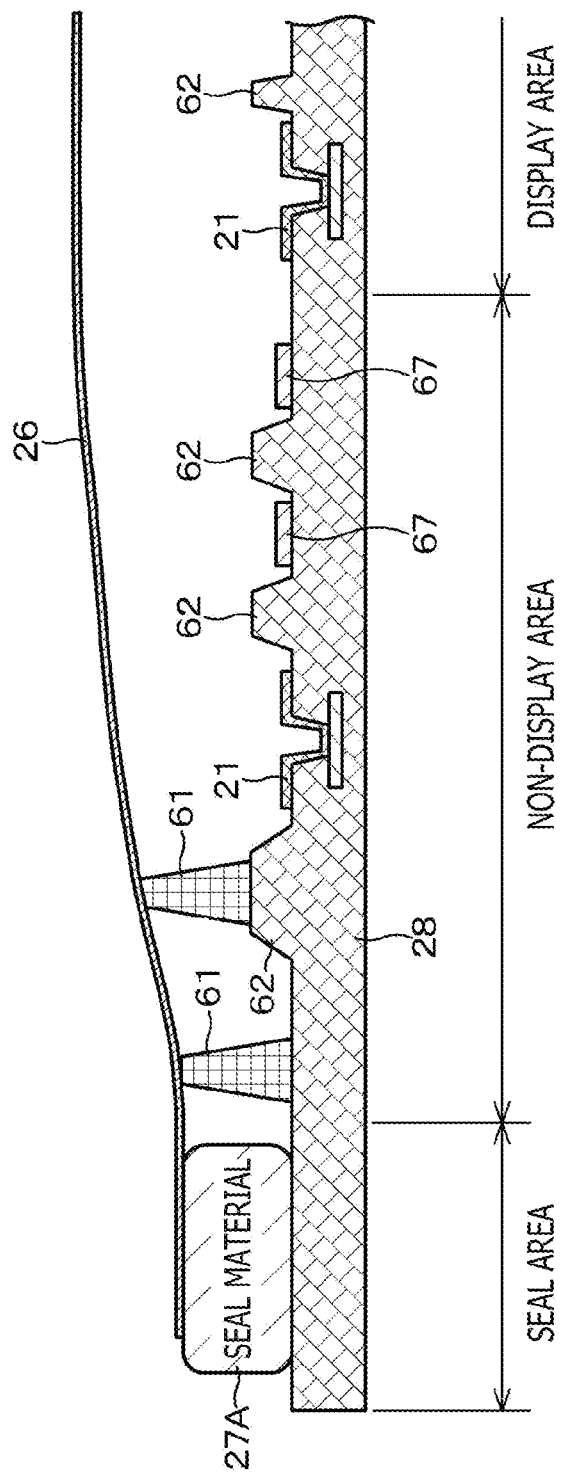
FIG. 13 is a cut-part end view illustrating a cross-sectional structure of the non-display area of a protrusion structure according to a seventh embodiment.

A seventh embodiment is a modified example of the sixth embodiment. In the seventh embodiment, the protrusion 62 in the non-display area is formed to overlap with and contain the cell gap spacer 61 as viewed from above. FIG. 13 is a cut-part end view illustrating a non-display area of a protrusion structure according to the seventh embodiment.

As illustrated in FIG. 13, the protrusion structure according to the seventh embodiment is configured so that the cell gap spacer 61 used for determining the cell gap and formed on the protrusion 62 for domain suppression in the non-display area, which does not contribute to image display, has smaller planar dimensions than the protrusion 62. Consequently, the relationship between the protrusion 62 and the cell gap spacer 61 is such that the protrusion 62 contains the cell gap spacer 61 as viewed from above. The seal material 27A for sealing the liquid crystal is disposed on the periphery (seal area) of the second substrate 26, which is the counter substrate.

Cell gap controllability can be improved by forming the cell gap spacer 61 on the protrusion 62 and using the difference in level of the protrusion 62 for cell gap formation in the manner described above.

Eighth Embodiment

An eighth embodiment is a modified example of the sixth embodiment. In the eighth embodiment, the protrusion 62 in the non-display area is formed in the seal area at the outer periphery of the non-display area. FIG. 14 is a cut-part end view illustrating a non-display area of a protrusion structure according to the eighth embodiment.

As illustrated in FIG. 14, the protrusion structure according to the eighth embodiment is configured so that the protrusion 62 in the non-display area is formed in the seal area of the liquid crystal layer 27, which is provided with the seal material 27A and disposed at the outer periphery of the non-display area. Further, a part of the seal material 27A for sealing the liquid crystal is disposed in overlap with the protrusion 62.

Cell gap controllability can be improved by disposing the protrusion 62 in the seal area and placing the second substrate 26, which is the counter substrate, along the outline of the protrusion 62 in the manner described above.

Ninth Embodiment

Figure 15A:
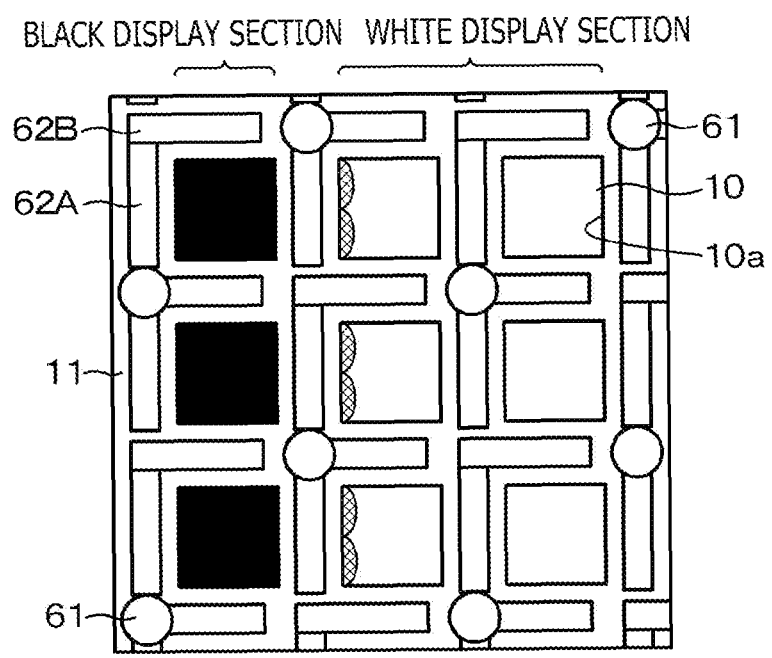
FIG. 15A is a plan view illustrating a first example arrangement of a protrusion structure according to a ninth embodiment.
Figure 15B:
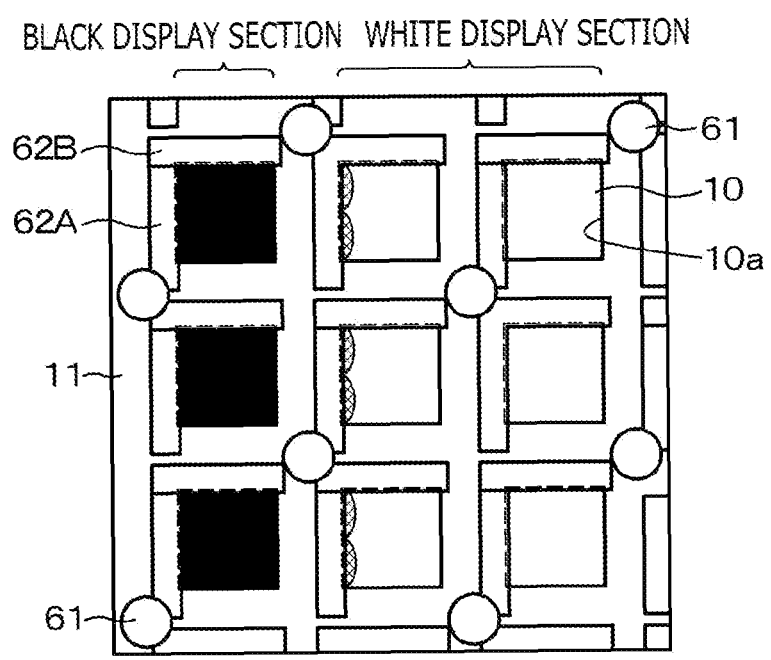
FIG. 15B is a plan view illustrating a second example arrangement of the protrusion structure according to the ninth embodiment.

A ninth embodiment is a modified example of the first embodiment. In the ninth embodiment, the protrusion 62 is shaped like a rectangle as viewed from above. FIGS. 15A and 15B are plan views respectively illustrating the first and second example arrangements of a protrusion structure according to the ninth embodiment. In both the first and second example arrangements, the protrusion 62 is shaped like a rectangle as viewed from above.

First Example Arrangement

As illustrated in FIG. 15A, the first example arrangement is configured so that, in a light shielding section 11 around a pixel 10, the protrusion 62 shaped like a rectangle as viewed from above is disposed along two sides, horizontal and vertical, of the pixel 10. In the following description, the protrusion 62 disposed along the vertical side of the pixel 10 is assumed to be the protrusion 62A, and the protrusion 62 disposed along the horizontal side of the pixel 10 is assumed to be the protrusion 62B. It is preferable that the protrusion 62A and the protrusion 62B be connected at a corner of the pixel 10. Further, the protrusion 62A and the protrusion 62B may be connected to an adjacent pixel as viewed from above. In the first example arrangement, the cell gap spacer 61 may be disposed in overlap with the protrusion 62A and the protrusion 62B as viewed from above.

As the protrusion 62A and the protrusion 62B are shaped like a rectangle as viewed from above in the first example arrangement of the protrusion structure according to the ninth embodiment, areas disturbing the orientation of a liquid crystal, that is, areas causing light leakage, can be connected in horizontally and vertically. Therefore, domain suppression can be achieved more effectively.

Further, as the protrusion 62A and the protrusion 62B are shaped like a rectangle and connected to the horizontal and vertical sides of the pixel 10, pattern collapse can be inhibited during lithographical patterning and preliminary cleaning of a liquid crystal. Therefore, the protrusion 62A and the protrusion 62B can be formed to have a more miniaturized protrusion line width. This makes it possible to reduce light leakage caused by the protrusion 62A and the protrusion 62.

Second Example Arrangement

Figure 16:
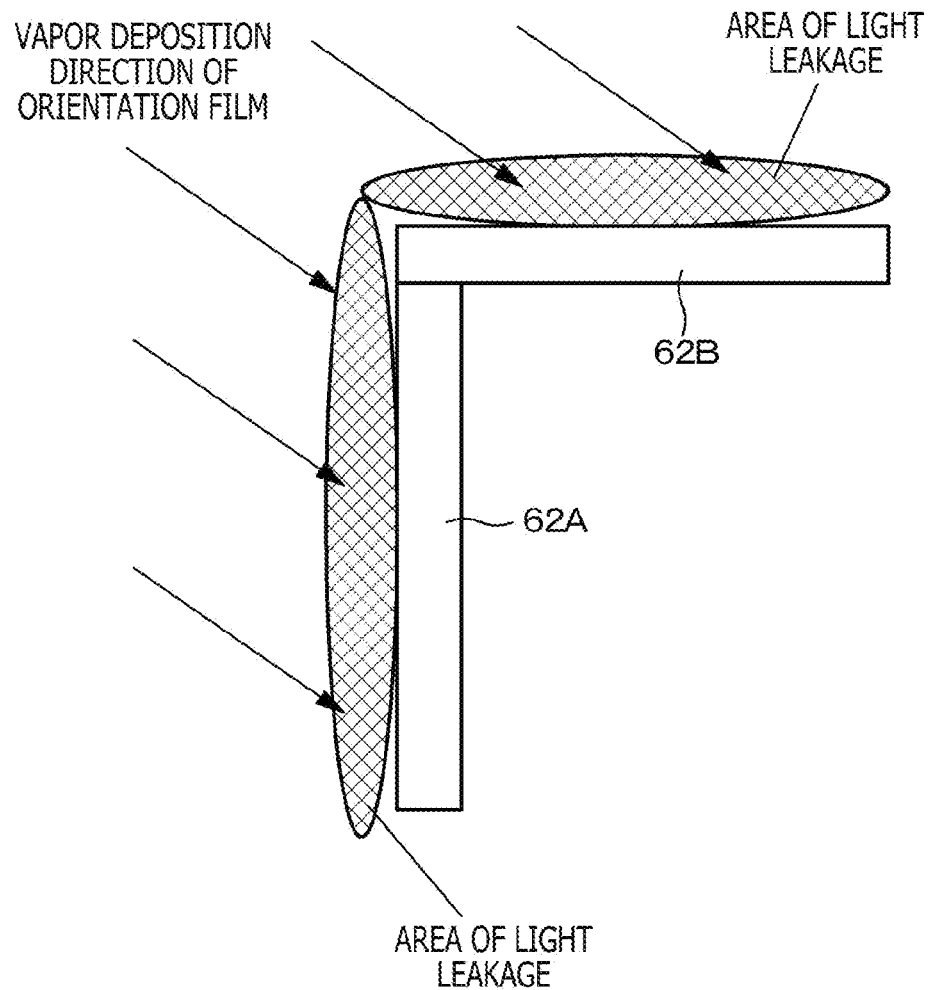
FIG. 16 is a diagram illustrating the relationship between the protrusion structure according to the ninth embodiment and the vapor deposition direction of an orientation film.

As illustrated in FIG. 15B, the second example arrangement is configured so that the protrusion 62A and the protrusion 62B disposed in the light shielding section 11 around a pixel 10 are disposed to overhang a part of an aperture 10a of the pixel 10 as viewed from above. More specifically, as illustrated in FIG. 16, the protrusion 62A and the protrusion 62B are disposed along the vapor deposition direction of an orientation film as viewed from above so as to overhang a part of the aperture 10a of the pixel 10.

In the second example arrangement of the protrusion structure according to the ninth embodiment, the protrusion 62A and the protrusion 62B are disposed along the vapor deposition direction of an orientation film as viewed from above so as to overhang a part of the aperture 10a. Therefore, it is possible to not only provide the above-described actions and advantages, but also to effectively shield light leakage caused by the protrusion 62A and the protrusion 62B by using the light shielding section 11 around the pixel 10. As a result, contrast degradation can be minimized.

<Electronic Equipment According to Present Disclosure>

The liquid crystal display apparatus according to the present disclosure, which has been described above, can be used as a display section (display apparatus) of electronic equipment that is used in all fields where video signals inputted to the electronic equipment or generated in the electronic equipment are displayed as still images or video images. For example, the liquid crystal display apparatus according to the present disclosure can be used as the display section of a projection display apparatus (projector), a smartphone, a head-mounted display, a digital still camera, a video camera, a mobile terminal apparatus such as a mobile phone, a notebook personal computer, a television set, or the like.

The liquid crystal display apparatus according to the present disclosure may be shaped like a module having a sealed configuration. For example, the liquid crystal display apparatus according to the present disclosure may be a display module that is formed by attaching a facing section such as a transparent glass section to the pixel array section. It should be noted that the display module may include a circuit section, flexible printed circuit (FPC), or the like for inputting/outputting signals, etc., from the outside to the pixel array section.

The liquid crystal display apparatus according to the present disclosure is able to suppress the liquid crystal domain and thus suppress image quality deterioration caused by the liquid crystal domain. Therefore, high-quality images can be displayed when the liquid crystal display apparatus according to the present disclosure is used as the display section (display apparatus) of electronic equipment in all fields.

As concrete examples of electronic equipment using the liquid crystal display apparatus according to the present disclosure, a projection display apparatus (projector), a smartphone, a head-mounted display, and a digital still camera are described below. However, the concrete examples given below are merely illustrative and not restrictive.

First Concrete Example

Example of Projection Display Apparatus

Figure 17:
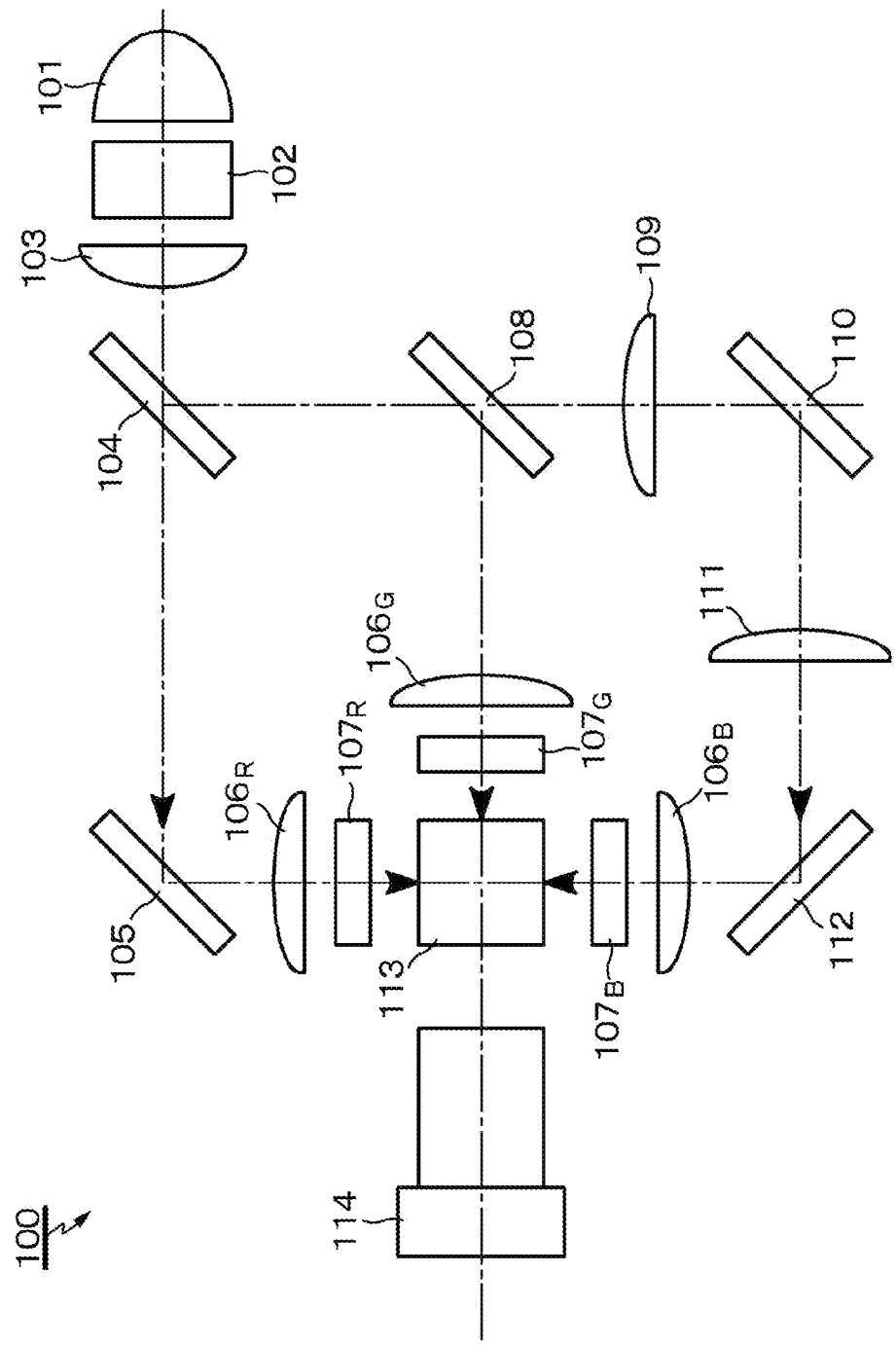
FIG. 17 is a schematic configuration diagram illustrating a basic configuration of a projection display apparatus (projector) according to a first concrete example of electronic equipment according to the present disclosure.

The projection display apparatus (what is generally called a projector) performs additive color mixing to achieve color display, and generally adopts a three-panel method of using liquid crystal panels respectively for three primary colors of light, namely, red (R), green (G), and blue (B), generating images of respective primary colors by using the three liquid crystal panels, and combining the generated images by using prisms. Liquid crystal panels of an approximately 1.0-inch size are generally used with the projection display apparatus. FIG. 17 is a schematic diagram illustrating an optical system of a three-panel projection display apparatus (projector) 100 according to the first concrete example of electronic equipment according to the present disclosure.

Referring to FIG. 17, white light emitted from a light source 101 such as a white lamp is converted from P-polarized light to S-polarized light by a polarization conversion element 102, then transmitted to a fly-eye lens 103 to provide uniform illumination, and incident on a dichroic mirror 104. Subsequently, only a specific color component, for example, the light component of R (red), is transmitted through the dichroic mirror 104, and the light components of the remaining colors are reflected from the dichroic mirror 104. The optical path of the R light component transmitted through the dichroic mirror 104 is changed by a mirror 105. Then, the R light component is passed through a lens 106R and incident on a liquid crystal panel 107R of R.

As regards the light components reflected from the dichroic mirror 104, for example, the light component of G (green) is reflected from a dichroic mirror 108, and the light component of B (blue) is transmitted through the dichroic mirror 108. The G light component reflected from the dichroic mirror 108 is passed through a lens 106G and then incident on a liquid crystal panel 107G of G. The B light component transmitted through the dichroic mirror 108 is passed through a lens 109. Then, the optical path of the B light component is changed by a mirror 110. Further, the B light component is passed through a lens 111, and then the optical path of the B light component is changed by a mirror 112. Eventually, the B light component is passed through a lens 106B and then incident on a liquid crystal panel 107B of B.

It should be noted that, although not depicted in FIG. 17, a polarizing plate is disposed on both the light incident side and the light emission side of the liquid crystal panels 107R, 107G, and 107B. As is well known, a normally white mode is set when a pair of polarizing plates on the light incident side and the light emission side are disposed in such a manner that their polarization directions are perpendicular to each other (crossed nicol), and a normally black mode is set when the pair of polarizing plates are disposed in such a manner that their polarization directions are parallel to each other (parallel nicol).

The R, G, and B light components passed respectively through the liquid crystal panels 107R, 107G, and 107B are incident on a cross prism 113 and combined by the cross prism 113. Light combined by the cross prism 113 is incident on a projection lens 114. The projection lens 114 projects the combined light onto a screen (not depicted).

In the three-panel projection display apparatus 100 having the above-described configuration, the liquid crystal display apparatus according to the present disclosure can be used as the liquid crystal panels 107R, 107G, and 107B, which are light modulation means (light valves). In other words, the projection display apparatus 100 according to the first concrete example described above is fabricated by using the liquid crystal display apparatus according to the present disclosure as the liquid crystal panels 107R, 107G, and 107B.

Second Concrete Example

Example of Smartphone

Figure 18A:
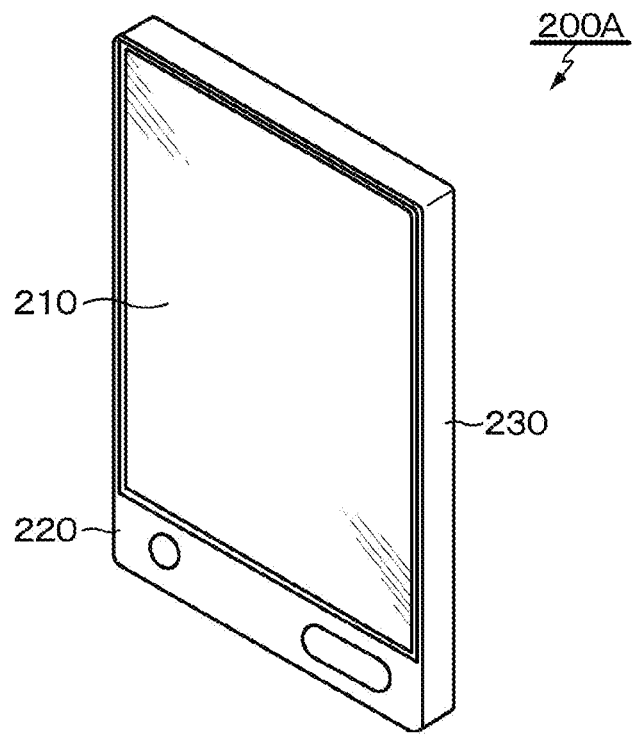
FIG. 18A is an external view illustrating a first example of a smartphone according to a second concrete example of the electronic equipment according to the present disclosure.
Figure 18B:
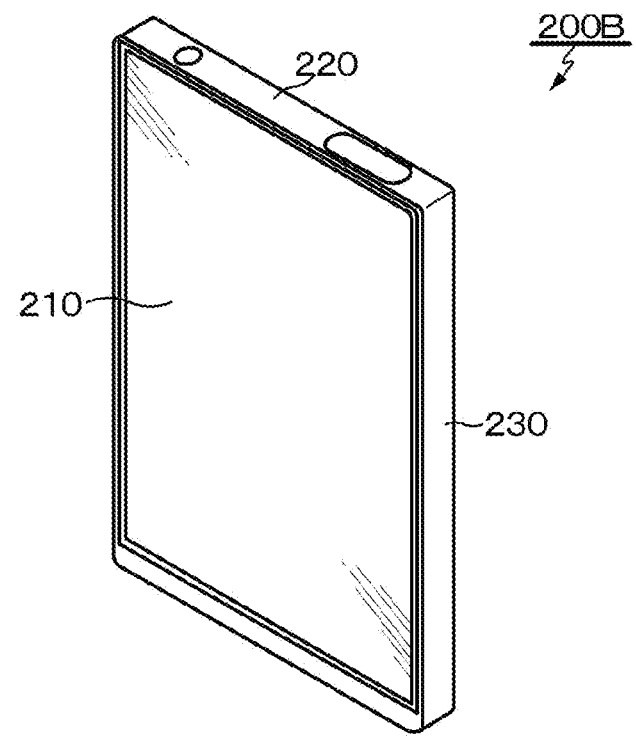
FIG. 18B is an external view illustrating a second example of the smartphone.

FIG. 18 depicts external views illustrating a smartphone according to a second concrete example of the electronic equipment according to the present disclosure. FIG. 18A is an external view illustrating a first example of the smartphone. FIG. 18B is an external view illustrating a second example of the smartphone.

A smartphone 200A in the first example and a smartphone 200B in the second example both include a display section 210 and an operating section 220. As for the smartphone 200A in the first example, the operating section 220 is disposed below the display section 210 on a housing 230. As for the smartphone 200B in the second example, the operating section 220 is disposed on the top surface of the housing 230. Further, the liquid crystal display apparatus according to the present disclosure can be used as the display section 210 of the smartphones 200A and 200B. In other words, the smartphones 200A and 200B according to the second concrete example described above are fabricated by using the liquid crystal display apparatus according to the present disclosure as their display section 210.

Third Concrete Example

Example of Head-Mounted Display

Figure 19:
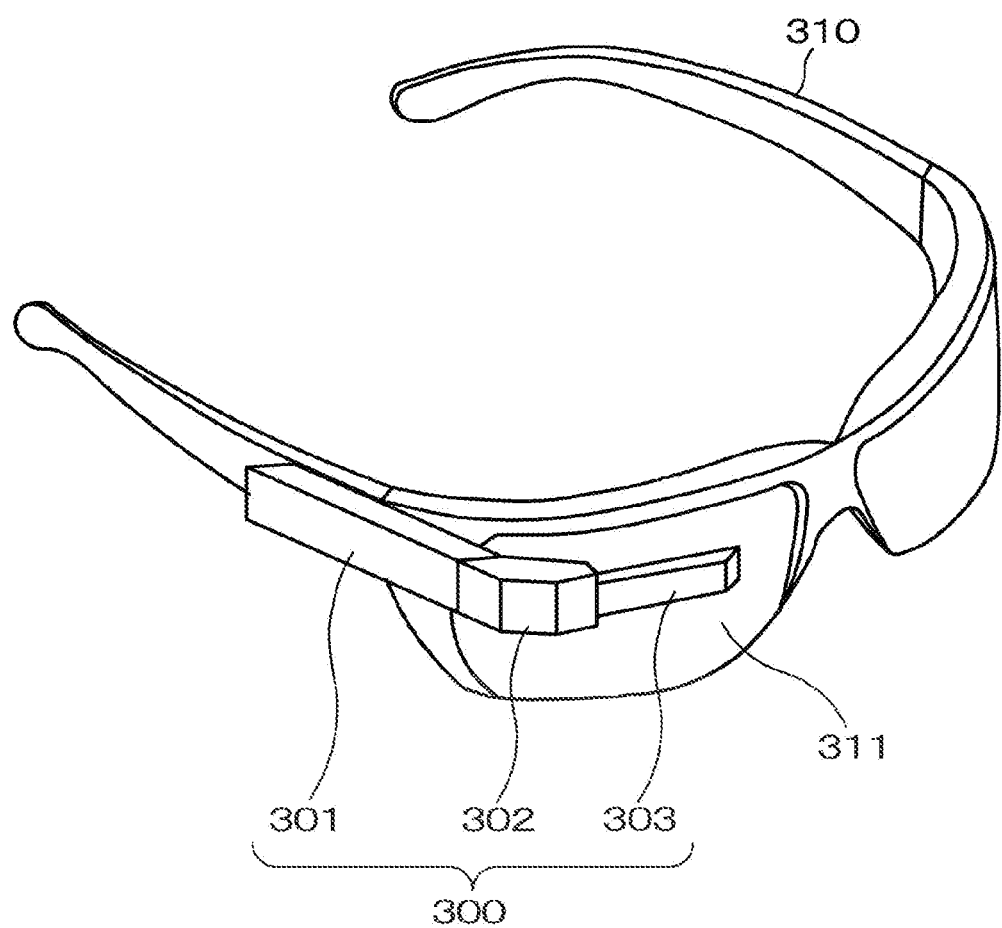
FIG. 19 is an external view illustrating a head-mounted display according to a third concrete example of the electronic equipment according to the present disclosure.

FIG. 19 is an external view illustrating a head-mounted display according to a third concrete example of the electronic equipment according to the present disclosure.

The head-mounted display 300 according to the third concrete example is configured as a transmissive head-mounted display that includes a main body section 301, an arm section 302, and a lens barrel 303. The main body section 301 is connected to the arm section 302 and eyeglasses 310. More specifically, an end in the long-side direction of the main body section 301 is attached to the arm section 302. Further, one end of a lateral surface of the main body section 301 is coupled to the eyeglasses 310 via a connection member (not depicted). It should be noted that the main body section 301 may be directly mounted on a human head.

The main body section 301 incorporates a display section and a control circuit board for controlling the operation of the head-mounted display 300. By coupling the main body section 301 to the lens barrel 303, the arm section 302 supports the lens barrel 303 with respect to the main body section 301. More specifically, when coupled to an end of the main body section 301 and to an end of the lens barrel 303, the arm section 302 secures the lens barrel 303 to the main body section 301. Further, the arm section 302 incorporates a signal line for communicating data on images to be supplied from the main body section 301 to the lens barrel 303.

The lens barrel 303 projects image light, which is supplied from the main body section 301 via the arm section 302, onto the eyes of a user wearing the head-mounted display 300 through lenses 311 of the eyeglasses 310. In the head-mounted display 300, the liquid crystal display apparatus according to the present disclosure can be used as the display section incorporated in the main body section 301. In other words, the head-mounted display 300 according to the third concrete example described above is fabricated by using the liquid crystal display apparatus according to the present disclosure as the display section of the head-mounted display 300.

Fourth Concrete Example

Example of Digital Still Camera

Figure 20A:
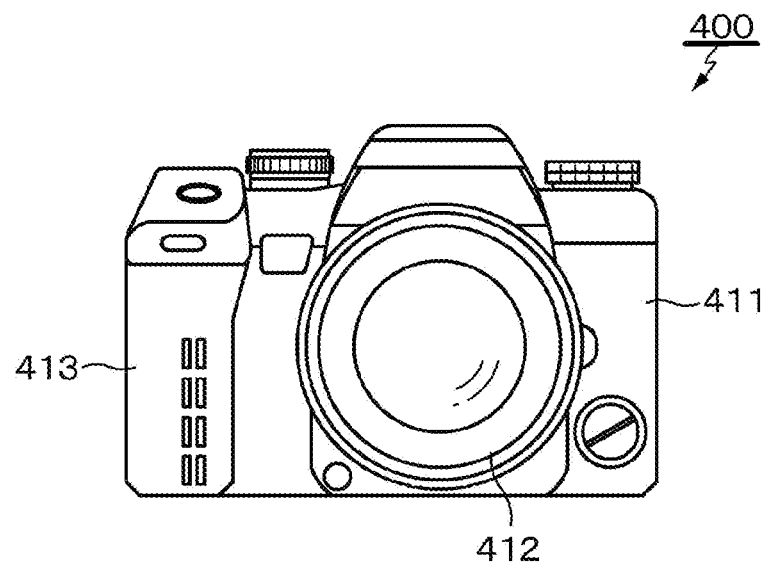
FIG. 20A is a front view illustrating a digital still camera according to a fourth concrete example of the electronic equipment according to the present disclosure.
Figure 20B:
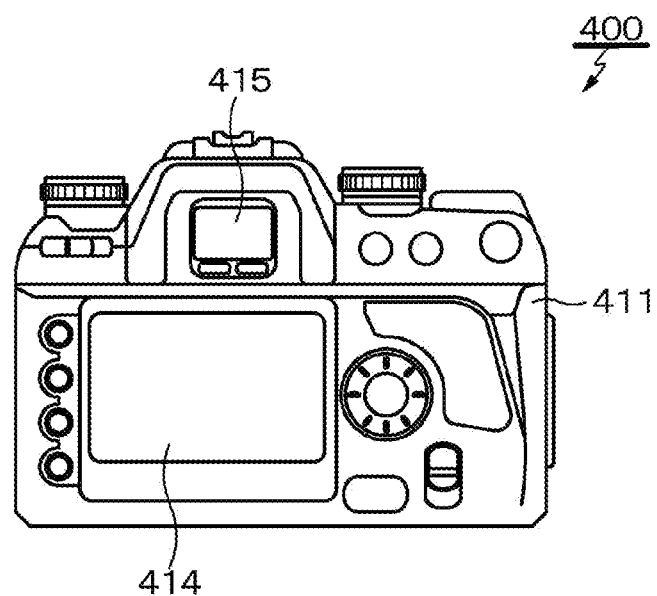
FIG. 20B is a rear view illustrating the digital still camera.

FIGS. 20A and 20B depicts external views illustrating an interchangeable single-lens reflex digital still camera according to a fourth concrete example of the electronic equipment according to the present disclosure. FIG. 20A is a front view illustrating the interchangeable single-lens reflex digital still camera. FIG. 20B is a rear view illustrating the interchangeable single-lens reflex digital still camera.

The interchangeable single-lens reflex digital still camera 400 includes, for example, an interchangeable photographic lens unit (interchangeable lenses) 412 and a grip section 413. The interchangeable photographic lens unit 412 is disposed on the front right side of a camera main body (camera body) 411. The grip section 413 is disposed on the front left side of the camera main body 411 and adapted to be gripped by a photographer. Further, a monitor 414 is disposed substantially at the center of the rear surface of the camera main body 411. A viewfinder (eyepiece window) 415 is disposed above the monitor 414. By looking into the viewfinder 415, the photographer is able to visually recognize the light image of an object introduced by the photographic lens unit 412 and determine a composition.

The liquid crystal display apparatus according to the present disclosure can be used as the viewfinder 415 of the interchangeable single-lens reflex digital still camera 400 having the above-described configuration. In other words, the interchangeable single-lens reflex digital still camera 400 according to the fourth concrete example described above is fabricated by using the liquid crystal display apparatus according to the present disclosure as the viewfinder 415 of the interchangeable single-lens reflex digital still camera 400.

<Configurations Supported by Present Disclosure>

It should be noted that the present disclosure may have the following configurations as well.

<<A. Liquid Crystal Display Apparatus>>

[A-1]

A liquid crystal display apparatus including:

a first substrate on which a pixel electrode and a first orientation film are formed;

a second substrate on which a common electrode and a second orientation film are formed; and a liquid crystal layer that is disposed between the first orientation film and the second orientation film, in which, within a display area, the liquid crystal layer contains a protrusion that does not contribute to formation of a cell gap, and the protrusion is formed by a same inorganic material as for an underlying film.

[A-2]

The liquid crystal display apparatus according to [A-1], in which a flat base surface of the protrusion is formed flush with a flat surface of an interlayer insulating film directly below the pixel electrode.

[A-3]

The liquid crystal display apparatus according to [A-1], in which the protrusion partly includes a recessed portion as viewed from above.

[A-4]

The liquid crystal display apparatus according to [A-1], in which a flat base surface of the protrusion is positioned closer to the liquid crystal layer than a flat surface of an interlayer insulating film directly below the pixel electrode.

[A-5]

The liquid crystal display apparatus according to any one of [A-1] to [A-4], in which the protrusion is disposed in overlap with a light shielding section in the display area as viewed from above.

[A-6]

The liquid crystal display apparatus according to [A-1],
in which a cell gap spacer for determining the cell gap is disposed, and
the protrusion is disposed in overlap with the cell gap spacer as viewed from above.

[A-7]

The liquid crystal display apparatus according to [A-1], in which the protrusion is additionally formed in a non-display area in a same processing step as for the display area.

[A-8]

The liquid crystal display apparatus according to [A-7], in which, as viewed from above, the protrusion in the non-display area is formed not in overlap with a wiring formed in a same processing step as for the pixel electrode.

[A-9]

The liquid crystal display apparatus according to [A-7],
in which a cell gap spacer for determining the cell gap is disposed, and
the protrusion in the non-display area is formed to overlap with and contain the cell gap spacer as viewed from above.

[A-10]

The liquid crystal display apparatus according to [A-7], in which the protrusion in the non-display area is formed in a seal area of the liquid crystal layer.

[A-11]

The liquid crystal display apparatus according to [A-1], in which the protrusion is shaped like a rectangle as viewed from above and disposed along two sides, horizontal and vertical, of a pixel in a light shielding section around the pixel.

[A-12]

The liquid crystal display apparatus according to [A-11], in which the protrusion is disposed along a vapor deposition direction of an orientation film as viewed from above so as to overhang a part of an aperture of the pixel.

<<B. Electronic Equipment>>

[B-1]

Electronic equipment including:
a liquid crystal display apparatus including
a first substrate on which a pixel electrode and a first orientation film are formed,
a second substrate on which a common electrode and a second orientation film are formed, and
a liquid crystal layer that is disposed between the first orientation film and the second orientation film,
within a display area, the liquid crystal layer containing a protrusion that does not contribute to formation of a cell gap, and
the protrusion being formed by a same inorganic material for an underlying film.

[B-2]

The electronic equipment according to [B-1], in which a flat base surface of the protrusion is formed flush with a flat surface of an interlayer insulating film directly below the pixel electrode.

[B-3]

The electronic equipment according to [B-1], in which the protrusion partly includes a recessed portion as viewed from above.

[B-4]

The electronic equipment according to [B-1], in which a flat base surface of the protrusion is positioned closer to the liquid crystal layer than a flat surface of an interlayer insulating film directly below the pixel electrode.

[B-5]

The electronic equipment according to any one of [B-1] to [B-4], in which the protrusion is disposed in overlap with a light shielding section in the display area as viewed from above.

[B-6]

The electronic equipment according to [B-1],
in which a cell gap spacer for determining the cell gap is disposed, and
the protrusion is disposed in overlap with the cell gap spacer as viewed from above.

[B-7]

The electronic equipment according to [B-1], in which the protrusion is additionally formed in a non-display area in a same processing step as for the display area.

[B-8]

The electronic equipment according to [B-7], in which, as viewed from above, the protrusion in the non-display area is formed not in overlap with a wiring formed in a same processing step as for the pixel electrode.

[B-9]

The electronic equipment according to [B-7],
in which a cell gap spacer for determining the cell gap is disposed, and
the protrusion in the non-display area is formed to overlap with and contain the cell gap spacer as viewed from above.

[B-10]

The electronic equipment according to [B-7], in which the protrusion in the non-display area is formed in a seal area of the liquid crystal layer.

[B-11]

The electronic equipment according to [B-1], in which the protrusion is shaped like a rectangle as viewed from above and disposed along two sides, horizontal and vertical, of a pixel in a light shielding section around the pixel.

[B-12]

The electronic equipment according to [B-11], in which the protrusion is disposed along a vapor deposition direction of an orientation film as viewed from above so as to overhang a part of an aperture of the pixel.

REFERENCE SIGNS LIST

1 . . . Liquid crystal display apparatus, 10 . . . Pixel, 20 . . . Pixel array section, 21 . . . Pixel electrode, 22 . . . First orientation film, 23 . . . First substrate (TFT substrate), 24 . . . Common electrode, 25 . . . Second orientation film, 26 . . . Second substrate (counter substrate), 27 . . . Liquid crystal layer, 28 . . . Interlayer insulating film (underlying film), 29 . . . wiring layer, 30 . . . Scan line drive section, 40 . . . Signal line drive section, $51_1$-$51_m$ . . . Scan line, $52_1$-$52_n$ . . . Signal line, 61 . . . Cell gap spacer, 62, 62a, 62b, 62c, 62A, 62B . . . Protrusion

The invention claimed is:

1. A liquid crystal display apparatus, comprising:
   a first substrate;
   an underlying film on the first substrate;
   an interlayer insulating film on the underlying film;
   a pixel electrode between the underlying film and the interlayer insulating film;
   a first orientation film on the first substrate;
   a second substrate;
   a common electrode on the second substrate;
   a second orientation film on the second substrate; and
   a liquid crystal layer between the first orientation film and the second orientation film, wherein
      within a display area of the liquid crystal display apparatus, the liquid crystal layer comprises a first protrusion that does not contribute to formation of a cell gap between the first substrate and the second substrate,
      the first protrusion and the interlayer insulating film comprise a same inorganic material, and
      the first protrusion is on the interlayer insulating film.

2. The liquid crystal display apparatus according to claim 1, wherein a flat base surface of the first protrusion is flush with a flat surface of the interlayer insulating film.

3. The liquid crystal display apparatus according to claim 1, wherein the first protrusion partly includes a recessed portion as viewed from above.

4. The liquid crystal display apparatus according to claim 1, wherein
   a flat base surface of the first protrusion is closer to the liquid crystal layer than a flat surface of the underlying film, and
   the underlying film is directly below the pixel electrode.

5. The liquid crystal display apparatus according to claim 1, wherein the first protrusion overlaps with a light shielding section in the display area as viewed from above.

6. The liquid crystal display apparatus according to claim 1, further comprising a cell gap spacer for determination of the cell gap,
   wherein the first protrusion overlaps with the cell gap spacer as viewed from above.

7. The liquid crystal display apparatus according to claim 1, further comprising a second protrusion in a non-display area of the liquid crystal display apparatus,
   wherein the second protrusion in the non-display area and the first protrusion in the display area are formed in a same processing step.

8. The liquid crystal display apparatus according to claim 7, further comprising a wiring in the non-display area, wherein
   as viewed from above, the second protrusion in the non-display area does not overlap with the wiring, and
   the wiring and the pixel electrode are formed in a same processing step.

9. The liquid crystal display apparatus according to claim 7, wherein the second protrusion includes a cell gap spacer for determination of the cell gap, and
   the second protrusion overlaps with the cell gap spacer as viewed from above.

10. The liquid crystal display apparatus according to claim 7, wherein the second protrusion in the non-display area is in a seal area of the liquid crystal layer.

11. The liquid crystal display apparatus according to claim 1, wherein
    the first protrusion has a rectangular shape as viewed from above, and
    the first protrusion is along a horizontal side and a vertical side of a pixel in a light shielding section around the pixel.

12. The liquid crystal display apparatus according to claim 11, wherein the first protrusion is along a vapor deposition direction of the second orientation film as viewed from above so as to overhang a part of an aperture of the pixel.

13. An electronic equipment, comprising:
    a liquid crystal display apparatus including:
       a first substrate;
       an underlying film on the first substrate;
       an interlayer insulating film on the underlying film;
       a pixel electrode between the underlying film and the interlayer insulating film;
       a first orientation film on the first substrate;
       a second substrate;
       a common electrode on the second substrate;
       a second orientation film on the second substrate; and
       a liquid crystal layer between the first orientation film and the second orientation film, wherein
          within a display area of the liquid crystal display apparatus, the liquid crystal layer comprises a protrusion that does not contribute to formation of a cell gap between the first substrate and the second substrate,
          the protrusion and the interlayer insulating film comprise a same inorganic material, and
          the protrusion is on the interlayer insulating film.

* * * * *